United States Patent
Luke et al.

(10) Patent No.: US 10,055,911 B2
(45) Date of Patent: Aug. 21, 2018

(54) APPARATUS, METHOD AND ARTICLE FOR AUTHENTICATION, SECURITY AND CONTROL OF POWER STORAGE DEVICES, SUCH AS BATTERIES, BASED ON USER PROFILES

(75) Inventors: Hok-Sum Horace Luke, Mercer Island, WA (US); Matthew Whiting Taylor, North Bend, WA (US)

(73) Assignee: Gogoro Inc., Hong Kong (CN)

( * ) Notice: Subject to any disclaimer, the term of this patent is extended or adjusted under 35 U.S.C. 154(b) by 1514 days.

(21) Appl. No.: 13/559,010

(22) Filed: Jul. 26, 2012

(65) Prior Publication Data

US 2013/0026972 A1 Jan. 31, 2013

Related U.S. Application Data

(60) Provisional application No. 61/511,900, filed on Jul. 26, 2011, provisional application No. 61/647,936, (Continued)

(51) Int. Cl.
*H02J 7/00* (2006.01)
*G07C 5/08* (2006.01)
(Continued)

(52) U.S. Cl.
CPC ............ *G07C 5/0858* (2013.01); *B60L 1/003* (2013.01); *B60L 1/02* (2013.01); *B60L 1/14* (2013.01);
(Continued)

(58) Field of Classification Search
CPC ......... G07C 5/0858; G07C 5/00; H01M 2/34; H01M 10/4257; H01M 2220/20;
(Continued)

(56) References Cited

U.S. PATENT DOCUMENTS

| 1,387,848 A | 8/1921 | Good |
| 3,470,974 A | 10/1969 | Pefine |

(Continued)

FOREIGN PATENT DOCUMENTS

| CA | 2 865 976 A1 | 9/2013 |
| CN | 1211844 A | 3/1999 |

(Continued)

OTHER PUBLICATIONS

Chen et al., "Apparatus, Method and Article for Providing Vehicle Diagnostic Data," U.S. Appl. No. 61/601,404, filed Feb. 21, 2012, 56 pages.

(Continued)

*Primary Examiner* — Nha Nguyen
(74) *Attorney, Agent, or Firm* — Perkins Coie LLP

(57) ABSTRACT

A network of collection, charging and distribution machines collect, charge and distribute portable electrical energy storage devices (e.g., batteries, supercapacitors or ultracapacitors). To charge, the machines employ electrical current from an external source, such as the electrical grid or an electrical service of an installation location. The charging and distribution machines may distribute portable electrical energy storage devices of particular performance characteristics and other attributes based on customer preferences and/or customer profiles. The charging and distribution machines may provide instructions to or otherwise program portable electrical energy storage devices stored within the charging and distribution machines to perform at various levels according to user preferences and user profiles.

11 Claims, 9 Drawing Sheets

Related U.S. Application Data filed on May 16, 2012, provisional application No. 61/534,753, filed on Sep. 14, 2011, provisional application No. 61/534,761, filed on Sep. 14, 2011, provisional application No. 61/534,772, filed on Sep. 14, 2011, provisional application No. 61/511,887, filed on Jul. 26, 2011, provisional application No. 61/647,941, filed on May 16, 2012, provisional application No. 61/511,880, filed on Jul. 26, 2011, provisional application No. 61/557,170, filed on Nov. 8, 2011, provisional application No. 61/581,566, filed on Dec. 29, 2011, provisional application No. 61/601,404, filed on Feb. 21, 2012, provisional application No. 61/601,949, filed on Feb. 22, 2012, provisional application No. 61/601,953, filed on Feb. 22, 2012.

(51) Int. Cl.

| | | |
|---|---|---|
| *B60L 1/00* | (2006.01) | |
| *B60L 1/02* | (2006.01) | |
| *B60L 1/14* | (2006.01) | |
| *B60L 3/00* | (2006.01) | |
| *B60L 7/06* | (2006.01) | |
| *B60L 7/14* | (2006.01) | |
| *B60L 7/22* | (2006.01) | |
| *B60L 11/00* | (2006.01) | |
| *B60L 11/18* | (2006.01) | |
| *B60L 15/20* | (2006.01) | |
| *E05B 81/56* | (2014.01) | |
| *G01C 21/34* | (2006.01) | |
| *G01C 21/36* | (2006.01) | |
| *G06F 3/06* | (2006.01) | |
| *G06Q 10/02* | (2012.01) | |
| *G06Q 30/02* | (2012.01) | |
| *G06Q 30/06* | (2012.01) | |
| *G07C 5/00* | (2006.01) | |
| *H01M 10/42* | (2006.01) | |
| *H01M 10/44* | (2006.01) | |
| *H01M 10/48* | (2006.01) | |
| *H02J 4/00* | (2006.01) | |
| *G07F 15/00* | (2006.01) | |
| *G07F 17/12* | (2006.01) | |
| *G07F 17/00* | (2006.01) | |

(52) U.S. Cl.
CPC .............. *B60L 3/003* (2013.01); *B60L 3/0046* (2013.01); *B60L 3/0061* (2013.01); *B60L 3/0069* (2013.01); *B60L 7/06* (2013.01); *B60L 7/14* (2013.01); *B60L 7/22* (2013.01); *B60L 11/005* (2013.01); *B60L 11/1803* (2013.01); *B60L 11/1822* (2013.01); *B60L 11/1824* (2013.01); *B60L 11/1838* (2013.01); *B60L 11/1842* (2013.01); *B60L 11/1846* (2013.01); *B60L 11/1848* (2013.01); *B60L 11/1851* (2013.01); *B60L 11/1857* (2013.01); *B60L 11/1861* (2013.01); *B60L 11/1874* (2013.01); *B60L 11/1877* (2013.01); *B60L 15/2045* (2013.01); *E05B 81/56* (2013.01); *G01C 21/3476* (2013.01); *G01C 21/3682* (2013.01); *G06F 3/0608* (2013.01); *G06F 3/0638* (2013.01); *G06F 3/0671* (2013.01); *G06Q 10/02* (2013.01); *G06Q 30/0253* (2013.01); *G06Q 30/0259* (2013.01); *G06Q 30/0261* (2013.01); *G06Q 30/0267* (2013.01); *G06Q 30/0639* (2013.01); *G07C 5/00* (2013.01); *G07F 15/003* (2013.01); *G07F 15/005* (2013.01); *G07F 15/006* (2013.01); *G07F 17/0042* (2013.01); *G07F 17/12* (2013.01); *H01M 10/425* (2013.01); *H01M 10/4257* (2013.01); *H01M 10/441* (2013.01); *H01M 10/482* (2013.01); *H02J 4/00* (2013.01); *H02J 7/00* (2013.01); *H02J 7/007* (2013.01); *H02J 7/0013* (2013.01); *B60L 2200/12* (2013.01); *B60L 2210/12* (2013.01); *B60L 2210/14* (2013.01); *B60L 2210/30* (2013.01); *B60L 2220/14* (2013.01); *B60L 2220/16* (2013.01); *B60L 2220/46* (2013.01); *B60L 2230/16* (2013.01); *B60L 2230/40* (2013.01); *B60L 2240/12* (2013.01); *B60L 2240/14* (2013.01); *B60L 2240/26* (2013.01); *B60L 2240/421* (2013.01); *B60L 2240/423* (2013.01); *B60L 2240/427* (2013.01); *B60L 2240/429* (2013.01); *B60L 2240/525* (2013.01); *B60L 2240/545* (2013.01); *B60L 2240/622* (2013.01); *B60L 2240/642* (2013.01); *B60L 2240/645* (2013.01); *B60L 2240/662* (2013.01); *B60L 2240/70* (2013.01); *B60L 2250/10* (2013.01); *B60L 2250/16* (2013.01); *B60L 2250/18* (2013.01); *B60L 2250/20* (2013.01); *B60L 2250/22* (2013.01); *B60L 2260/44* (2013.01); *B60L 2260/52* (2013.01); *B60L 2270/34* (2013.01); *B60L 2270/46* (2013.01); *H01M 2010/4278* (2013.01); *H01M 2220/20* (2013.01); *H01M 2220/30* (2013.01); *H02J 2007/0001* (2013.01); *H02J 2007/0098* (2013.01); *Y02E 60/12* (2013.01); *Y02E 60/721* (2013.01); *Y02T 10/645* (2013.01); *Y02T 10/7005* (2013.01); *Y02T 10/705* (2013.01); *Y02T 10/7011* (2013.01); *Y02T 10/7022* (2013.01); *Y02T 10/7044* (2013.01); *Y02T 10/7055* (2013.01); *Y02T 10/7072* (2013.01); *Y02T 10/7088* (2013.01); *Y02T 10/7094* (2013.01); *Y02T 10/7225* (2013.01); *Y02T 10/7233* (2013.01); *Y02T 10/7241* (2013.01); *Y02T 10/7258* (2013.01); *Y02T 10/7283* (2013.01); *Y02T 10/7291* (2013.01); *Y02T 10/92* (2013.01); *Y02T 90/121* (2013.01); *Y02T 90/124* (2013.01); *Y02T 90/127* (2013.01); *Y02T 90/128* (2013.01); *Y02T 90/14* (2013.01); *Y02T 90/16* (2013.01); *Y02T 90/161* (2013.01); *Y02T 90/162* (2013.01); *Y02T 90/163* (2013.01); *Y02T 90/168* (2013.01); *Y02T 90/169* (2013.01); *Y04S 10/126* (2013.01); *Y04S 30/12* (2013.01); *Y04S 30/14* (2013.01); *Y04S 50/10* (2013.01); *Y04S 50/14* (2013.01); *Y10T 70/7062* (2015.04); *Y10T 307/406* (2015.04)

(58) Field of Classification Search
CPC .............. H01M 2200/00; G06Q 10/02; G06Q 30/0259; G06Q 30/0639; G06Q 30/0267; G06Q 30/0253; B60L 11/1838; B60L 11/1822; B60L 3/0069; B60L 11/005; B60L 11/1824; B60L 3/003; B60L 11/1846; B60L 11/1861; B60L 2210/14; B60L 2210/30; B60L 2230/40; B60L 2230/16; B60L 2210/12; B60L 2200/12; B60L 2240/70; H02J 7/0013; H02J 4/00; H02J 7/007; H02J 7/00; H02J 2007/0098; H02J 2007/0001; E05B 81/56; G01C 21/3476; Y10T 307/406; Y10T 70/7062; Y02T 10/7072; Y02T 10/92; Y02T 10/7291; Y02T 10/7094; Y02T 90/169;

Y02T 90/124; Y02T 10/7233; Y02T 90/168; Y02T 90/127; Y02T 90/14; Y02T 10/7044; Y02T 90/128; Y02T 10/7011; Y02T 90/16; Y02T 10/7005; Y02T 10/7022

See application file for complete search history.

(56) References Cited

U.S. PATENT DOCUMENTS

| | | |
|---|---|---|
| 3,664,450 A | 5/1972 | Udden et al. |
| 3,678,455 A | 7/1972 | Levey |
| 3,687,484 A | 8/1972 | Cosby |
| 3,708,028 A | 1/1973 | Hafer |
| 4,087,895 A | 5/1978 | Etienne |
| 4,129,759 A | 12/1978 | Hug |
| 4,216,839 A | 8/1980 | Gould et al. |
| 4,641,124 A | 2/1987 | Davis |
| 4,669,570 A | 6/1987 | Perret |
| 5,187,423 A | 2/1993 | Marton |
| 5,189,325 A | 2/1993 | Jarczynski |
| 5,236,069 A | 8/1993 | Peng |
| 5,339,250 A | 8/1994 | Durbin |
| 5,349,535 A | 9/1994 | Gupta |
| 5,376,869 A | 12/1994 | Konrad |
| 5,491,486 A | 2/1996 | Welles, II et al. |
| 5,544,784 A | 8/1996 | Malaspina |
| 5,596,261 A | 1/1997 | Suyama |
| 5,627,752 A | 5/1997 | Buck et al. |
| 5,631,536 A * | 5/1997 | Tseng .................. 320/137 |
| 5,642,270 A | 6/1997 | Green et al. |
| 5,815,824 A | 9/1998 | Saga et al. |
| 5,839,800 A | 11/1998 | Koga et al. |
| 5,898,282 A | 4/1999 | Drozdz et al. |
| 5,929,608 A | 7/1999 | Ibaraki et al. |
| 5,998,963 A | 12/1999 | Aarseth |
| 6,016,882 A | 1/2000 | Ishikawa |
| 6,154,006 A | 11/2000 | Hatanaka et al. |
| 6,177,867 B1 | 1/2001 | Simon et al. |
| 6,177,879 B1 | 1/2001 | Kokubu et al. |
| 6,236,333 B1 | 5/2001 | King |
| 6,403,251 B1 | 6/2002 | Baggaley et al. |
| 6,429,622 B1 | 8/2002 | Svensson |
| 6,494,279 B1 | 12/2002 | Hutchens |
| 6,498,457 B1 | 12/2002 | Tsuboi |
| 6,515,580 B1 | 2/2003 | Isoda et al. |
| 6,583,592 B2 | 6/2003 | Omata et al. |
| 6,593,713 B2 | 7/2003 | Morimoto et al. |
| 6,614,204 B2 | 9/2003 | Pellegrino et al. |
| 6,621,244 B1 | 9/2003 | Kiyomiya et al. |
| 6,796,396 B2 | 9/2004 | Kamen et al. |
| 6,822,560 B2 | 11/2004 | Geber et al. |
| 6,854,773 B2 | 2/2005 | Lin |
| 6,899,268 B2 | 5/2005 | Hara |
| 6,917,306 B2 | 7/2005 | Lilja |
| 6,952,795 B2 | 10/2005 | O'Gorman et al. |
| 7,010,682 B2 | 3/2006 | Reinold et al. |
| 7,111,179 B1 | 9/2006 | Girson et al. |
| 7,131,005 B2 | 10/2006 | Levenson et al. |
| 7,392,068 B2 | 6/2008 | Dayan et al. |
| 7,415,332 B2 | 8/2008 | Ito et al. |
| 7,426,910 B2 | 9/2008 | Elwart |
| 7,495,543 B2 | 2/2009 | Denison et al. |
| 7,567,166 B2 | 7/2009 | Bourgine De Meder |
| 7,592,728 B2 | 9/2009 | Jones et al. |
| 7,596,709 B2 | 9/2009 | Cooper et al. |
| 7,617,893 B2 | 11/2009 | Syed et al. |
| 7,630,181 B2 | 12/2009 | Wilk et al. |
| 7,698,044 B2 | 4/2010 | Prakash et al. |
| 7,728,548 B2 | 6/2010 | Daynes et al. |
| 7,761,307 B2 | 7/2010 | Ochi et al. |
| 7,778,746 B2 | 8/2010 | McLeod et al. |
| 7,863,858 B2 | 1/2011 | Gangstoe et al. |
| 7,868,591 B2 | 1/2011 | Phillips et al. |
| 7,898,439 B2 | 3/2011 | Bettez et al. |
| 7,908,020 B2 | 3/2011 | Pieronek |
| 7,923,144 B2 | 4/2011 | Kohn et al. |
| 7,948,207 B2 | 5/2011 | Scheucher |
| 7,979,147 B1 | 7/2011 | Dunn |
| 7,993,155 B2 | 8/2011 | Heichal et al. |
| 8,006,793 B2 | 8/2011 | Heichal et al. |
| 8,006,973 B2 | 8/2011 | Toba et al. |
| 8,013,571 B2 | 9/2011 | Agassi et al. |
| 8,035,341 B2 | 10/2011 | Genzel et al. |
| 8,035,349 B2 | 10/2011 | Lubawy |
| 8,063,762 B2 | 11/2011 | Sid |
| 8,068,952 B2 | 11/2011 | Valentine et al. |
| 8,098,050 B2 | 1/2012 | Takahashi |
| 8,106,631 B2 | 1/2012 | Abe |
| 8,118,132 B2 | 2/2012 | Gray, Jr. |
| 8,164,300 B2 | 4/2012 | Agassi et al. |
| 8,219,839 B2 | 7/2012 | Akimoto |
| 8,229,625 B2 | 7/2012 | Lal et al. |
| 8,265,816 B1 | 9/2012 | LaFrance |
| 8,301,365 B2 | 10/2012 | Niwa et al. |
| 8,319,605 B2 | 11/2012 | Hassan et al. |
| 8,326,259 B2 | 12/2012 | Gautama et al. |
| 8,354,768 B2 | 1/2013 | Cipriani |
| 8,355,965 B2 | 1/2013 | Yamada |
| 8,412,401 B2 | 4/2013 | Bertosa et al. |
| 8,437,908 B2 | 5/2013 | Goff et al. |
| 8,447,598 B2 | 5/2013 | Chutorash et al. |
| 8,564,241 B2 | 10/2013 | Masuda |
| 8,614,565 B2 | 12/2013 | Lubawy |
| 8,725,135 B2 | 5/2014 | Weyl et al. |
| 2001/0018903 A1 | 9/2001 | Hirose et al. |
| 2001/0052433 A1 | 12/2001 | Harris et al. |
| 2002/0023789 A1 | 2/2002 | Morisawa et al. |
| 2002/0070851 A1 | 6/2002 | Raichle et al. |
| 2003/0052796 A1 | 3/2003 | Schmidt et al. |
| 2003/0141840 A1 | 7/2003 | Sanders |
| 2003/0163434 A1 | 8/2003 | Barends |
| 2003/0209375 A1 | 11/2003 | Suzuki et al. |
| 2004/0130292 A1 | 7/2004 | Buchanan et al. |
| 2004/0236615 A1 | 11/2004 | Msndy |
| 2004/0246119 A1 | 12/2004 | Martin et al. |
| 2005/0247446 A1 | 11/2005 | Gawthrop |
| 2006/0046895 A1 | 3/2006 | Thacher et al. |
| 2006/0047380 A1 | 3/2006 | Welch |
| 2006/0208850 A1 | 9/2006 | Ikeuchi et al. |
| 2006/0284601 A1 | 12/2006 | Salasoo et al. |
| 2007/0026996 A1 | 2/2007 | Ayabe et al. |
| 2007/0035397 A1 | 2/2007 | Patenaude et al. |
| 2007/0069687 A1 | 3/2007 | Suzuki |
| 2007/0090921 A1 | 4/2007 | Fisher |
| 2007/0126395 A1 | 6/2007 | Suchar |
| 2007/0145945 A1 | 6/2007 | McGinley et al. |
| 2007/0159297 A1 | 7/2007 | Paulk et al. |
| 2007/0175429 A1 | 8/2007 | Yanagida et al. |
| 2007/0208468 A1 | 9/2007 | Sankaran et al. |
| 2007/0238164 A1 | 10/2007 | Kim |
| 2008/0015721 A1 | 1/2008 | Spearman |
| 2008/0084177 A1 | 4/2008 | Sander et al. |
| 2008/0143292 A1 | 6/2008 | Ward |
| 2008/0154801 A1 | 6/2008 | Fein et al. |
| 2008/0276110 A1 | 11/2008 | Indiani et al. |
| 2009/0024872 A1 | 1/2009 | Beverly |
| 2009/0033456 A1 | 2/2009 | Castillo et al. |
| 2009/0045773 A1 | 2/2009 | Pandya et al. |
| 2009/0082957 A1 | 3/2009 | Agassi et al. |
| 2009/0112394 A1 | 4/2009 | Lepejian et al. |
| 2009/0158790 A1 | 6/2009 | Oliver |
| 2009/0198372 A1 * | 8/2009 | Hammerslag .................. 700/226 |
| 2009/0240575 A1 | 9/2009 | Bettez et al. |
| 2009/0251300 A1 | 10/2009 | Yasuda et al. |
| 2009/0261779 A1 | 10/2009 | Zyren |
| 2009/0273235 A1 | 11/2009 | Ichikawa |
| 2009/0294188 A1 | 12/2009 | Cole |
| 2010/0013433 A1 | 1/2010 | Baxter et al. |
| 2010/0026238 A1 | 2/2010 | Suzuki et al. |
| 2010/0051363 A1 | 3/2010 | Inoue et al. |
| 2010/0052588 A1 | 3/2010 | Okamura et al. |
| 2010/0079115 A1 | 4/2010 | Lubawy |
| 2010/0089547 A1 | 4/2010 | King et al. |
| 2010/0094496 A1 | 4/2010 | Hershkovitz et al. |
| 2010/0114798 A1 | 5/2010 | Sirton |

(56) References Cited

U.S. PATENT DOCUMENTS

| | | |
|---|---|---|
| 2010/0114800 A1 | 5/2010 | Yasuda et al. |
| 2010/0134067 A1 | 6/2010 | Baxter et al. |
| 2010/0145717 A1* | 6/2010 | Hoeltzel ............ 705/1.1 |
| 2010/0161481 A1 | 6/2010 | Littrell |
| 2010/0188043 A1* | 7/2010 | Kelty et al. ............ 320/109 |
| 2010/0191585 A1 | 7/2010 | Smith |
| 2010/0198535 A1 | 8/2010 | Brown et al. |
| 2010/0198754 A1 | 8/2010 | Jones et al. |
| 2010/0201482 A1 | 8/2010 | Robertson et al. |
| 2010/0225266 A1 | 9/2010 | Hartman |
| 2010/0235043 A1 | 9/2010 | Seta et al. |
| 2010/0250043 A1 | 9/2010 | Scheucher |
| 2010/0308989 A1 | 12/2010 | Gasper |
| 2010/0324800 A1 | 12/2010 | Hanft et al. |
| 2011/0016063 A1 | 1/2011 | Pollack et al. |
| 2011/0025267 A1 | 2/2011 | Kamen et al. |
| 2011/0029157 A1 | 2/2011 | Muzaffer |
| 2011/0031929 A1 | 2/2011 | Asada et al. |
| 2011/0032110 A1 | 2/2011 | Taguchi |
| 2011/0060481 A1 | 3/2011 | Kang et al. |
| 2011/0071932 A1 | 3/2011 | Agassi et al. |
| 2011/0082598 A1 | 4/2011 | Boretto et al. |
| 2011/0082621 A1 | 4/2011 | Berkobin et al. |
| 2011/0084665 A1 | 4/2011 | White et al. |
| 2011/0106329 A1 | 5/2011 | Donnelly et al. |
| 2011/0112710 A1 | 5/2011 | Meyer-Ebeling et al. |
| 2011/0114798 A1 | 5/2011 | Gemmati |
| 2011/0120789 A1 | 5/2011 | Teraya |
| 2011/0148346 A1 | 6/2011 | Gagosz et al. |
| 2011/0153141 A1 | 6/2011 | Beechie et al. |
| 2011/0156662 A1 | 6/2011 | Nakamura et al. |
| 2011/0160992 A1 | 6/2011 | Crombez |
| 2011/0169447 A1 | 7/2011 | Brown et al. |
| 2011/0191265 A1 | 8/2011 | Lowenthal et al. |
| 2011/0200193 A1 | 8/2011 | Blitz et al. |
| 2011/0202476 A1 | 8/2011 | Nagy et al. |
| 2011/0218703 A1 | 9/2011 | Uchida |
| 2011/0224868 A1* | 9/2011 | Collings et al. ............ 701/35 |
| 2011/0224900 A1 | 9/2011 | Hiruta et al. |
| 2011/0241824 A1 | 10/2011 | Uesugi |
| 2011/0248668 A1 | 10/2011 | Davis et al. |
| 2011/0260691 A1 | 10/2011 | Ishibashi et al. |
| 2011/0270480 A1 | 11/2011 | Ishibashi et al. |
| 2011/0279257 A1 | 11/2011 | Au et al. |
| 2011/0282527 A1 | 11/2011 | Inbarajan et al. |
| 2011/0292667 A1 | 12/2011 | Meyers |
| 2011/0295454 A1 | 12/2011 | Meyers |
| 2011/0303509 A1 | 12/2011 | Agassi et al. |
| 2012/0000720 A1 | 1/2012 | Honda et al. |
| 2012/0013182 A1 | 1/2012 | Minegishi et al. |
| 2012/0019196 A1 | 1/2012 | Fung |
| 2012/0038473 A1 | 2/2012 | Fecher |
| 2012/0062361 A1 | 3/2012 | Kosugi |
| 2012/0068817 A1 | 3/2012 | Fisher |
| 2012/0078413 A1 | 3/2012 | Baker, Jr. |
| 2012/0105078 A1 | 5/2012 | Kikuchi et al. |
| 2012/0109519 A1 | 5/2012 | Uyeki |
| 2012/0123661 A1 | 5/2012 | Gray, Jr. |
| 2012/0126969 A1 | 5/2012 | Wilbur et al. |
| 2012/0143410 A1 | 6/2012 | Gallagher et al. |
| 2012/0157083 A1 | 6/2012 | Otterson |
| 2012/0158229 A1 | 6/2012 | Schaefer |
| 2012/0167071 A1 | 6/2012 | Paek |
| 2012/0173292 A1 | 7/2012 | Solomon et al. |
| 2012/0194346 A1 | 8/2012 | Tsai et al. |
| 2012/0223575 A1 | 9/2012 | Hachiya et al. |
| 2012/0233077 A1 | 9/2012 | Tate, Jr. et al. |
| 2012/0248868 A1 | 10/2012 | Mobin et al. |
| 2012/0248869 A1 | 10/2012 | Itagaki et al. |
| 2012/0253567 A1 | 10/2012 | Levy et al. |
| 2012/0256588 A1 | 10/2012 | Hayashi et al. |
| 2012/0259665 A1 | 10/2012 | Pandhi et al. |
| 2012/0271723 A1 | 10/2012 | Penilla et al. |
| 2012/0280573 A1 | 11/2012 | Ohkura et al. |
| 2012/0296512 A1 | 11/2012 | Lee et al. |
| 2012/0299527 A1 | 11/2012 | Vo |
| 2012/0299537 A1 | 11/2012 | Kikuchi |
| 2012/0299721 A1 | 11/2012 | Jones |
| 2012/0316671 A1 | 12/2012 | Hammerslag et al. |
| 2012/0319649 A1 | 12/2012 | Billmaier |
| 2013/0024306 A1 | 1/2013 | Shah et al. |
| 2013/0026973 A1 | 1/2013 | Luke et al. |
| 2013/0027183 A1 | 1/2013 | Wu et al. |
| 2013/0030581 A1 | 1/2013 | Luke et al. |
| 2013/0030696 A1 | 1/2013 | Wu et al. |
| 2013/0033203 A1 | 2/2013 | Luke et al. |
| 2013/0046457 A1 | 2/2013 | Pettersson |
| 2013/0074411 A1 | 3/2013 | Ferguson et al. |
| 2013/0090795 A1 | 4/2013 | Luke et al. |
| 2013/0093271 A1 | 4/2013 | Luke et al. |
| 2013/0093368 A1 | 4/2013 | Luke et al. |
| 2013/0093384 A1 | 4/2013 | Nyu et al. |
| 2013/0116892 A1 | 5/2013 | Wu et al. |
| 2013/0119898 A1 | 5/2013 | Ohkura |
| 2013/0127416 A1 | 5/2013 | Karner et al. |
| 2013/0132307 A1 | 5/2013 | Phelps et al. |
| 2013/0151049 A1 | 6/2013 | Higashitani et al. |
| 2013/0151293 A1 | 6/2013 | Karner et al. |
| 2013/0166119 A1 | 6/2013 | Kummer et al. |
| 2013/0179061 A1 | 7/2013 | Gadh et al. |
| 2013/0181582 A1 | 7/2013 | Luke et al. |
| 2013/0200845 A1 | 8/2013 | Bito |
| 2013/0221928 A1 | 8/2013 | Kelty et al. |
| 2013/0254097 A1 | 9/2013 | Marathe et al. |
| 2013/0282254 A1 | 10/2013 | Dwan et al. |
| 2013/0345935 A1 | 12/2013 | Chang |
| 2014/0163813 A1 | 6/2014 | Chen et al. |
| 2014/0368032 A1 | 12/2014 | Doerndorfer |
| 2015/0046012 A1 | 2/2015 | Chen et al. |
| 2015/0153967 A1 | 6/2015 | Chen et al. |

FOREIGN PATENT DOCUMENTS

| | | |
|---|---|---|
| CN | 101071953 A | 11/2007 |
| CN | 102064565 A | 5/2011 |
| CN | 101950998 B | 9/2012 |
| DE | 44 32 539 A1 | 6/1995 |
| DE | 10 2007 045633 A1 | 4/2009 |
| DE | 10 2009 016869 A1 | 10/2010 |
| DE | 10 2010 039075 A1 | 2/2011 |
| EP | 0 693 813 A1 | 1/1996 |
| EP | 1 177 955 A2 | 2/2002 |
| EP | 1 667 306 A1 | 6/2006 |
| EP | 1 798 100 A2 | 6/2007 |
| EP | 2 101 390 A2 | 9/2009 |
| EP | 2 182 575 A1 | 5/2010 |
| EP | 2 230 146 A2 | 9/2010 |
| EP | 2305510 | 4/2011 |
| EP | 2 428 939 A1 | 3/2012 |
| JP | 5-38003 A | 2/1993 |
| JP | 5-135804 A | 6/1993 |
| JP | 07-031008 A | 1/1995 |
| JP | 7-36504 | 7/1995 |
| JP | 8-178683 A | 7/1996 |
| JP | 9-119839 A | 5/1997 |
| JP | 10-117406 A | 5/1998 |
| JP | 10-170293 A | 6/1998 |
| JP | 10-307952 A | 11/1998 |
| JP | 11-049079 | 2/1999 |
| JP | 11-51681 A | 2/1999 |
| JP | H1155869 | 2/1999 |
| JP | 11-176487 A | 7/1999 |
| JP | 11-205914 A | 7/1999 |
| JP | 2000-102102 | 4/2000 |
| JP | 2000-102103 A | 4/2000 |
| JP | 2000-341868 A | 12/2000 |
| JP | 2001/023037 A | 1/2001 |
| JP | 2001-57711 A | 2/2001 |
| JP | 2001-128301 | 5/2001 |
| JP | 2002-140398 A | 5/2002 |
| JP | 2002/324264 A | 11/2002 |
| JP | 2003-102110 A | 4/2003 |
| JP | 2003-118397 | 4/2003 |
| JP | 2003-262525 A | 9/2003 |

(56) References Cited

FOREIGN PATENT DOCUMENTS

| | | |
|---|---|---|
| JP | 2004-215468 A | 7/2004 |
| JP | 2005-67453 A | 3/2005 |
| JP | 2005323455 | 11/2005 |
| JP | 2006-121874 A | 5/2006 |
| JP | 2007-35479 A | 2/2007 |
| JP | 2007-60353 A | 3/2007 |
| JP | 2007-118642 A | 5/2007 |
| JP | 2007-148590 A | 6/2007 |
| JP | 2007259600 | 10/2007 |
| JP | 2007-325458 A | 12/2007 |
| JP | 2008016229 | 1/2008 |
| JP | 2008-127894 A | 6/2008 |
| JP | 2008-219953 A | 9/2008 |
| JP | 2008-285075 A | 11/2008 |
| JP | 2008-301598 A | 12/2008 |
| JP | 2009-8609 A | 1/2009 |
| JP | 2009022069 | 1/2009 |
| JP | 2009-512035 A | 3/2009 |
| JP | 2009-103504 A | 5/2009 |
| JP | 2009-171646 A | 7/2009 |
| JP | 2009-171647 A | 7/2009 |
| JP | 4319289 B2 | 8/2009 |
| JP | 2009248888 | 10/2009 |
| JP | 2009-303364 A | 12/2009 |
| JP | 2010-022148 A | 1/2010 |
| JP | 2010-108833 A | 5/2010 |
| JP | 2010124634 | 6/2010 |
| JP | 2010-148246 A | 7/2010 |
| JP | 2010/172122 A | 8/2010 |
| JP | 2010-179764 A | 8/2010 |
| JP | 2010-186238 A | 8/2010 |
| JP | 2010-191636 A | 9/2010 |
| JP | 2010-200405 A | 9/2010 |
| JP | 2010-212048 A | 9/2010 |
| JP | 2010225528 | 10/2010 |
| JP | 2010259238 | 11/2010 |
| JP | 2010-269686 A | 12/2010 |
| JP | 2010-540907 A | 12/2010 |
| JP | 2011-83166 A | 4/2011 |
| JP | 2011-102801 A | 5/2011 |
| JP | 2011/118638 A | 6/2011 |
| JP | 2011-126452 | 6/2011 |
| JP | 2011-131631 A | 7/2011 |
| JP | 2011-131805 A | 7/2011 |
| JP | 2011/142704 A | 7/2011 |
| JP | 2011-142779 A | 7/2011 |
| JP | 2011-233470 A | 11/2011 |
| JP | 2012-151916 A | 8/2012 |
| JP | 2012-526409 A | 10/2012 |
| JP | 2012214060 | 11/2012 |
| KR | 1998-045020 U | 9/1998 |
| KR | 2004-0005146 A | 1/2004 |
| KR | 20100012401 A | 2/2010 |
| KR | M379269 U1 | 4/2010 |
| KR | 10-0971278 B1 | 7/2010 |
| KR | 20110004292 A | 1/2011 |
| KR | 20110041783 A | 4/2011 |
| KR | 20120020554 A | 3/2012 |
| TW | 477099 B | 2/2002 |
| TW | 200836452 A | 9/2008 |
| TW | I315116 B | 9/2009 |
| TW | M371880 U1 | 1/2010 |
| TW | M379789 U1 | 5/2010 |
| TW | M385047 U1 | 7/2010 |
| TW | 201043986 A1 | 12/2010 |
| TW | 201044266 A1 | 12/2010 |
| TW | 201044289 A | 12/2010 |
| TW | 201105985 A | 2/2011 |
| TW | 201112579 A | 4/2011 |
| WO | 98/21132 A1 | 5/1998 |
| WO | 99/03186 A1 | 1/1999 |
| WO | 2009/039454 A1 | 3/2009 |
| WO | 2010/005052 A2 | 1/2010 |
| WO | 2010/033517 A2 | 3/2010 |
| WO | 2010/033881 A1 | 3/2010 |
| WO | 2010/035605 A1 | 4/2010 |
| WO | 2010/115573 A1 | 10/2010 |
| WO | 2010/143483 A1 | 12/2010 |
| WO | 2011/138205 A1 | 11/2011 |
| WO | 2012/085992 A1 | 6/2012 |
| WO | 2012/160407 A1 | 11/2012 |
| WO | 2012/160557 A2 | 11/2012 |
| WO | 2013/024483 A2 | 2/2013 |
| WO | 2013/024484 A1 | 2/2013 |
| WO | 2013/042216 A1 | 3/2013 |
| WO | 2013/074819 A1 | 5/2013 |
| WO | 2013/080211 A1 | 6/2013 |
| WO | 2013/102894 A1 | 7/2013 |
| WO | 2013/108246 A2 | 7/2013 |
| WO | 2013/118113 A2 | 8/2013 |
| WO | 2013/128007 A2 | 9/2013 |
| WO | 2013/128009 A2 | 9/2013 |
| WO | 2013/128009 A3 | 9/2013 |
| WO | 2013/142154 A1 | 9/2013 |
| WO | 2013/144951 A1 | 10/2013 |

OTHER PUBLICATIONS

Chen et al., "Apparatus, Method and Article for Providing Vehicle Diagnostic Data," U.S. Appl. No. 13/559,390, filed Jul. 26, 2012, 61 pages.

Luke et al., "Apparatus, Method and Article for Authentication, Security and Control of Power Storage Devices, Such as Batteries, Based on User Profiles," U.S. Appl. No. 61/534,772, filed Sep. 14, 2011, 55 pages.

Luke et al., "Apparatus, Method and Article for Collection, Charging and Distributing Power Storage Device, Such as Batteries," U.S. Appl. No. 61/511,900, filed Jul. 26, 2011, 73 pages.

Luke et al., "Apparatus, Method and Article for Authentication, Security and Control of Power Storage Devices, Such as Batteries," U.S. Appl. No. 61/534,761, filed Sep. 14, 2011, 55 pages.

Luke et al., "Apparatus, Method and Article for Collection, Charging and Distributing Power Storage Devices, Such as Batteries," U.S. Appl. No. 61/647,936, filed May 16, 2012, 76 pages.

Luke et al., "Apparatus, Method and Article for Collection, Charging and Distributing Power Storage Devices, Such as Batteries," U.S. Appl. No. 13/559,314, filed Jul. 26, 2012, 81 pages.

Luke et al., "Apparatus, Method and Article for Redistributing Power Storage Devices, Such as Batteries, Between Collection, Charging and Distribution Machines," U.S. Appl. No. 61/534,753, filed Sep. 14, 2011, 65 pages.

Luke et al., "Apparatus, Method and Article for Reserving Power Storage Devices at Reserving Power Storage Device Collection, Charging and Distribution Machines," U.S. Appl. No. 13/559,064, filed Jul. 26, 2012, 72 pages.

Luke et al., "Dynamically Limiting Vehicle Operation for Best Effort Economy," U.S. Appl. No. 61/511,880, filed Jul. 26, 2011, 52 pages.

Luke et al., "Dynamically Limiting Vehicle Operation for Best Effort Economy," U.S. Appl. No. 13/559,264, filed Jul. 26, 2012, 56 pages.

Luke et al., "Thermal Management of Components in Electric Motor Drive Vehicles," U.S. Appl. No. 61/511,887, filed Jul. 26, 2011, 44 pages.

Luke et al., "Thermal Management of Components in Electric Motor Drive Vehicles," U.S. Appl. No. 61/647,941, filed May 16, 2012, 47 pages.

Taylor et al., "Apparatus, Method and Article for Physical Security of Power Storage Devices in Vehicles," U.S. Appl. No. 61/557,170, filed Nov. 8, 2011, 60 pages.

Taylor et al., "Apparatus, Method and Article for Physical Security of Power Storage Devices in Vehicles," U.S. Appl. No. 13/559,054, filed Jul. 26, 2012, 64 pages.

Wu et al., "Apparatus, Method and Article for a Power Storage Device Compartment," U.S. Appl. No. 61/581,566, filed Dec. 29, 2011, 61 pages.

Wu et al., "Apparatus, Method and Article for Providing Information Regarding Availability of Power Storage Devices at a Power

(56) References Cited

OTHER PUBLICATIONS

Storage Device Collection, Charging and Distribution Machine," U.S. Appl. No. 61/601,953, filed Feb. 22, 2012, 53 pages.
Wu et al., "Apparatus, Method and Article for Providing Information Regarding Availability of Power Storage Devices at a Power Storage Device Collection, Charging and Distribution Machine," U.S. Appl. No. 13/559,343, filed Jul. 26, 2012, 56 pages.
Wu et al., "Apparatus, Method and Article for Providing Locations of Power Storage Device Collection, Charging and Distribution Machines," U.S. Appl. No. 61/601,949, filed Feb. 22, 2012, 56 pages.
Chen et al., "Apparatus, Method and Article for Providing Vehicle Diagnostic Data," Office Action dated Dec. 30, 2013, for U.S. Appl. No. 14/022,134, 20 pages.
International Preliminary Report on Patentability and Written Opinion for corresponding International Patent Application No. PCT/US2012/048349, dated Jan. 28, 2014, 5 pages.
International Preliminary Report on Patentability and Written Opinion for corresponding International Patent Application No. PCT/US2012/048354, dated Jan. 28, 2014, 7 pages.
International Preliminary Report on Patentability and Written Opinion for corresponding International Patent Application No. PCT/US2012/048358, dated Jan. 28, 2014, 5 pages.
International Preliminary Report on Patentability and Written Opinion for corresponding International Patent Application No. PCT/US2012/048366, dated Jan. 28, 2014, 5 pages.
International Preliminary Report on Patentability and Written Opinion for corresponding International Patent Application No. PCT/US2012/048367, dated Jan. 28, 2014, 4 pages.
International Preliminary Report on Patentability and Written Opinion for corresponding International Patent Application No. PCT/US2012/048375, dated Jan. 28, 2014, 5 pages.
International Preliminary Report on Patentability and Written Opinion for corresponding International Patent Application No. PCT/US2012/048379, dated Jan. 28, 2014, 5 pages.
International Preliminary Report on Patentability and Written Opinion for corresponding International Patent Application No. PCT/US2012/048380, dated Jan. 28, 2014, 5 pages.
International Preliminary Report on Patentability and Written Opinion for corresponding International Patent Application No. PCT/US2012/048382, dated Jan. 28, 2014, 5 pages.
International Preliminary Report on Patentability and Written Opinion for corresponding International Patent Application No. PCT/US2012/048391, dated Jan. 28, 2014, 6 pages.
International Search Report and Written Opinion for corresponding International Patent Application No. PCT/US2012/048347, dated Dec. 18, 2012, 8 pages.
Luke et al., "Apparatus, Method and Article for Authentication, Security and Control of Portable Charging Devices and Power Storage Devices, Such as Batteries," Office Action dated Jan. 6, 2014, for U.S. Appl. No. 14/017,090, 19 pages.
Luke et al., "Drive Assembly for Electric Powered Device," U.S. Appl. No. 61/546,411, filed Oct. 12, 2011, 18 pages.
Luke, "Apparatus, Method and Article for Providing Information Regarding a Vehicle via a Mobile Device," Office Action for U.S. Appl. No. 14/017,081, dated Jan. 30, 2014, 36 pages.
International Search Report and Written Opinion for corresponding International Application No. PCT/US2012/048391, dated Dec. 21, 2012, 9 pages.
"Inrunner," retreived from URL=http://en.wikipedia.org/w/index.php?title=Inrunner&printable=yes on Sep. 28, 2011, 1 page.
"Outrunner," retreived from URL=http://en.wikipedia.org/w/index.php?title=Outrunner&printable=yes on Sep. 16, 2011, 2 pages.
Chen et al., "Adjusting Electric Vehicle Systems Based on an Electrical Energy Storage Device Thermal Profile," U.S. Appl. No. 61/862,854, filed Aug. 6, 2013, 74 pages.
Chen et al., "Apparatus, Method and Article for Providing Vehicle Diagnostic Data," Office Action dated Apr. 9, 2014, for U.S. Appl. No. 14/022,134, 20 pages.

Chen et al., "Apparatus, Method and Article for Providing Vehicle Diagnostic Data," Notice of Allowance dated Jul. 9, 2014, for U.S. Appl. No. 14/022,134, 10 pages.
Chen et al., "Apparatus, Method and Article for Providing Vehicle Diagnostic Data," Office Action dated Jun. 18, 2014, for U.S. Appl. No. 13/559,390, 16 pages.
Chen et al., "Systems and Methods for Powering Electric Vehicles Using a Single or Multiple Power Cells," U.S. Appl. No. 61/862,852, filed Aug. 6, 2013, 46 pages.
International Search Report and Written Opinion for corresponding International Patent Application No. PCT/US2012/048344, dated Feb. 28, 2013, 9 page.
International Search Report and Written Opinion for corresponding International Application No. PCT/US2012/058930, dated Mar. 15, 2013, 11 pages.
International Search Report and Written Opinion for corresponding International Application No. PCT/US2012/059931, dated Mar. 29, 2013, 13 pages.
International Search Report and Written Opinion, for corresponding International Application No. PCT/US2014/021369, dated Jul. 2, 2014, 14 pages.
International Search Report and Written Opinion for corresponding International Application No. PCT/US2014/022610, dated Jul. 10, 2014, 12 pages.
International Search Report and Written Opinion for corresponding International Application No. PCT/US2014/024757, dated Jul. 11, 2014, 15 pages.
Luke et al., "Portable Electrical Energy Storage Device," U.S. Appl. No. 61/872,126, filed Aug. 30, 2013, 39 pages.
Luke et al., "Apparatus, Method and Article for Authentication, Security and Control of Portable Charging Devices and Power Storage Devices, Such as Batteries," Office Action dated Jun. 26, 2014, for U.S. Appl. No. 14/017,090, 19 pages.
Luke et al., "Electric Device Drive Assembly and Cooling System," U.S. Appl. No. 61/615,144, filed Mar. 23, 2012, 43 pages.
Luke et al., "Apparatus, Method and Article for Authentication, Security and Control of Power Storage Devices, Such as Batteries," Office Action dated Aug. 19, 2014, for U.S. Appl. No. 13/559,038, 14 pages.
Luke et al., "Dynamically Limiting Vehicle Operation for Best Effort Economy," Office Action for U.S. Appl. No. 13/559,264, dated Aug. 19, 2014, 26 pages.
Luke et al., "Thermal Management of Components in Electric Motor Drive Vehicles," Office Action dated Apr. 2, 2014, for U.S. Appl. No. 13/559,259, 11 pages.
Luke, "Apparatus, Method and Article for Changing Portable Electrical Power Storage Device Exchange Plans," U.S. Appl. No. 14/204,587, filed Mar. 11, 2014, 56 pages.
Microchip, "AN885: Brushless DC (BLDC) Motor Fundamentals," Microchip Technology Inc., 2003, 19 pages.
Wu et al., "Apparatus, Method and Article for Providing to a User Device Information Regarding Availability of Portable Electrical Energy Storage Devices At a Portable Electrical Energy Storage Device Collection, Charging and Distribution Machine," Notice of Allowance dated Jun. 30, 2014, for U.S. Appl. No. 14/022,140, 5 pages.
Wu et al., "Apparatus, Method and Article for Providing Locations of Power Storage Device Collection, Charging and Distribution Machines," Notice of Allowance dated Jul. 10, 2014, for U.S. Appl. No. 13/559,333, 9 pages.
Wu et al., "Apparatus, Method and Article for Power Storage Device Failure Safety," U.S. Appl. No. 14/071,134, filed Nov. 4, 2013, 68 pages.
Wu et al., "Apparatus, Method and Article for Power Storage Device Failure Safety," Office Action for U.S. Appl. No. 14/071,134, dated Feb. 12, 2014, 14 pages.
Wu et al., "Apparatus, Method and Article for Power Storage Device Failure Safety," Office Action dated Jun. 9, 2014, for U.S. Appl. No. 14/071,134, 15 pages.
Chen et al., "Apparatus, System, and Method for Authentication of Vehicular Components," U.S. Appl. No. 13/918,703, filed Jun. 14, 2013, 84 pages.

(56) References Cited

OTHER PUBLICATIONS

Chen et al., "Apparatus, System, and Method for Authentication of Vehicular Components," U.S. Appl. No. 61/783,041, filed Mar. 14, 2013, 84 pages.
Chen et al., "Apparatus, System, and Method for Authentication of Vehicular Components," Office Action dated Nov. 22, 2013, for U.S. Appl. No. 13/918,703, 35 pages.
Chen et al., "Apparatus, Method and Article for Providing Vehicle Diagnostic Data," U.S. Appl. No. 14/022,134, filed Sep. 9, 2013, 61 pages.
Huang et al., "Apparatus, Method and Article for Vehicle Turn Signals," U.S. Appl. No. 61/727,403, filed Nov. 16, 2012, 41 pages.
Huang et al., "Apparatus, Method and Article for Vehicle Turn Signals," U.S. Appl. No. 14/079,894, filed Nov. 14, 2013, 41 pages.
International Search Report and Written Opinion for corresponding European Patent Application No. PCT/US2012/048349, dated Feb. 18, 2013, 9 pages.
International Search Report and Written Opinion for corresponding European Patent Application No. PCT/US2012/048354, dated Feb. 18, 2013, 11 pages.
International Search Report and Written Opinion for corresponding European Patent Application No. PCT/US2012/048358, dated Feb. 25, 2013, 9 pages.
International Search Report and Written Opinion for corresponding European Patent Application No. PCT/US2012/048366, dated Jan. 21, 2013, 10 pages.
International Search Report and Written Opinion for corresponding European Patent Application No. PCT/US2012/048367, dated Jan. 17, 2013, 8 pages.
International Search Report and Written Opinion for corresponding European Patent Application No. PCT/US2012/048375, dated Jan. 23, 2013, 9 pages.
International Search Report and Written Opinion for corresponding European Patent Application No. PCT/US2012/048379, dated Dec. 17, 2012, 9 pages.
International Search Report and Written Opinion for corresponding International Patent Application No. PCT/US2012/048380, dated Feb. 27, 2013, 9 pages.
International Search Report and Written Opinion for corresponding International Patent Application No. PCT/US2012/048382, dated Feb. 27, 2013, 9 pages.
International Search Report and Written Opinion for corresponding European Patent Application No. PCT/US2012/063979, dated Mar. 4, 2013, 10 pages.
Luke et al., "Apparatus, Method and Article for Authentication, Security and Control of Portable Charging Devices and Power Storage Devices, Such as Batteries," U.S. Appl. No. 14/017,090, filed Sep. 3, 2013, 69 pages.
Luke et al., "Apparatus, Method and Article for Authentication, Security and Control of Portable Charging Devices and Power Storage Devices, Such as Batteries," U.S. Appl. No. 61/773,621, filed Mar. 6, 2013, 69 pages.
Luke et al., "Apparatus, Method and Article for Providing Targeted Advertising in a Rechargeable Electrical Power Storage Device Distribution Environment," U.S. Appl. No. 61/773,614, filed Mar. 6, 2013, 77 pages.
Luke et al., "Detectible Indication of an Electric Motor Vehicle Standby Mode," U.S. Appl. No. 61/543,720, filed Oct. 5, 2011, 35 pages.
Luke et al., "Detectible Indication of an Electric Motor Vehicle Standby Mode," U.S. Appl. No. 61/684,432, filed Aug. 17, 2012, 41 pages.
Luke et al., "Modular System for Collection and Distribution of Electric Storage Devices," U.S. Appl. No. 61/789,065, filed Mar. 15, 2013, 76 pages.
Luke et al., "Apparatus, Method and Article for Authentication, Security and Control of Power Storage Devices, Such as Batteries," U.S. Appl. No. 14/023,344, filed Sep. 10, 2013, 59 pages.

Luke et al., "Apparatus, Method and Article for Redistributing Power Storage Devices, Such as Batteries, Between Collection Charging and Distribution Machines," U.S. Appl. No. 13/559,091, filed Jul. 26, 2012, 69 pages.
Luke et al., "Detectible Indication of an Electric Motor Vehicle Standby Mode," U.S. Appl. No. 13/646,320, filed Oct. 5, 2012, 41 pages.
Luke et al., "Dynamically Limiting Vehicle Operation for Best Effort Economy," Office Action for U.S. Appl. No. 13/559,264, dated Aug. 14, 2013, 21 pages.
Luke, "Apparatus, Method and Article for Changing Portable Electrical Power Storage Device Exchange Plans," U.S. Appl. No. 61/778,038, filed Mar. 12, 2013, 56 pages.
Luke, "Apparatus, Method and Article for Providing Information Regarding a Vehicle via a Mobile Device," U.S. Appl. No. 14/017,081, filed Sep. 3, 2013, 81 pages.
Luke, "Apparatus, Method and Article for Providing Information Regarding a Vehicle via a Mobile Device," U.S. Appl. No. 61/780,781, filed Mar. 13, 2013, 80 pages.
Taylor et al., "Apparatus, Method and Article for Physical Security of Power Storage Devices in Vehicles," Notice of Allowance for U.S. Appl. No. 13/559,054, dated May 30, 2013, 32 pages.
Taylor et al., "Apparatus, Method and Article for Physical Security of Power Storage Devices in Vehicles," Office Action for U.S. Appl. No. 13/559,054, dated Dec. 3, 2012, 11 pages.
Taylor et al., "Apparatus, Method and Article for Physical Security of Power Storage Devices in Vehicles," U.S. Appl. No. 14/012,845, filed Aug. 28, 2013, 64 pages.
Wu et al., "Battery Configuration for an Electric Vehicle," U.S. Appl. No. 61/716,388, filed Oct. 19, 2012, 37 pages.
Wu et al., "Apparatus, Method and Article for Providing Information Regarding Availability of Power Storage Devices at a Power Storage Device Collection, Charging and Distribution Machine," U.S. Appl. No. 14/022,140, filed Sep. 9, 2013, 56 pages.
Wu et al., "Apparatus, Method and Article for Providing Locations of Power Storage Device Collection, Charging and Distribution Machines," Office Action for U.S. Appl. No. 13/559,333, dated Jul. 3, 2013, 14 pages.
Wu et al., "Apparatus, Method and Article for Providing Locations of Power Storage Device Collection, Charging and Distribution Machines," U.S. Appl. No. 14/022,147, filed Sep. 9, 2013, 56 pages.
Wu et al., "Apparatus, Method and Article for Providing Locations of Power Storage Device Collection, Charging and Distribution Machines," Office Action dated Nov. 19, 2013, for U.S. Appl. No. 14/022,147, 10 pages.
Wu et al., "Apparatus, Method and Article for Providing Locations of Power Storage Device Collection, Charging and Distribution Machines," Office Action dated Nov. 27, 2013, for U.S. Appl. No. 13/559,333, 19 pages.
Wu et al., "Apparatus, Method and Article for Security of Vehicles," U.S. Appl. No. 61/557,176, filed Nov. 8, 2011, 37 pages.
Wu, "Battery Configuration for an Electric Vehicle," U.S. Appl. No. 14/057,405, filed Oct. 18, 2013, 38 pages.
Chen et al., "Systems and Methods for Powering Electric Vehicles Using a Single of Multiple Power Cells," U.S. Appl. No. 14/453,156, filed Aug. 6, 2014, 46 pages.
International Search Report and Written Opinion for corresponding International Application No. PCT/US2013/065704, dated Feb. 13, 2014, 13 pages.
International Search Report and Written Opinion for corresponding International Application No. PCT/US2014/050001, dated Nov. 18, 2014, 9 pages.
Luke et al., "Detectible Indication of an Electric Motor Vehicle Standby Mode," Notice of Allowance dated Apr. 10, 2014, for U.S. Appl. No. 13/646,320, 8 pages.
Luke et al., "Dynamically Limiting Vehicle Operation for Best Effort Economy," Office Action for U.S. Appl. No. 13/559,264, dated Jan. 21, 2015, 31 pages.
Luke, "Apparatus, Method and Article for Providing Information Regarding a Vehicle Via a Mobile Device," Office Action for U.S. Appl. No. 14/017,081, dated Dec. 31, 2014, 59 pages.

(56) References Cited

OTHER PUBLICATIONS

Chen et al., "Apparatus, System, and Method for Authentication of Vehicular Components," Notice of Allowance dated Mar. 25, 2014, for U.S. Appl. No. 13/918,703, 7 pages.
Communication pursuant to Rules 161(2) and 162 EPC, for corresponding European Patent Application No. 12817273.1, dated Mar. 25, 2014, 3 pages.
Communication pursuant to Rules 161(2) and 162 EPC, for corresponding European Patent Application No. 12817141.0, dated Mar. 26, 2014, 3 pages.
Communication pursuant to Rules 161(2) and 162 EPC, for corresponding European Patent Application No. 12818308.4, dated Mar. 26, 2014, 3 pages.
Communication pursuant to Rules 161(2) and 162 EPC, for corresponding European Patent Application No. 12817696.3, dated Mar. 27, 2014, 3 pages.
Communication pursuant to Rules 161(2) and 162 EPC, for corresponding European Patent Application No. 12817883.7, dated Mar. 27, 2014, 3 pages.
Communication pursuant to Rules 161(2) and 162 EPC, for corresponding European Patent Application No. 12818447.0, dated Mar. 27, 2014, 3 pages.
International Search Report and Written Opinion for corresponding International Application No. PCT/US2013/070131, dated Feb. 19, 2014, 17 pages.
Luke et al., "Detectible Indication of an Electric Motor Vehicle Standby Mode," Office Action for U.S. Appl. No. 13/646,320, dated May 30, 2013, 13 pages.
Luke et al., "Modular System for Collection and Distribution of Electric Storage Devices," U.S. Appl. No. 14/202,589, filed Mar. 10, 2014, 76 pages.
Luke et al., "Apparatus, Method and Article for Authentication, Security and Control of Power Storage Devices, Such as Batteries," Office Action dated Feb. 26, 2014, for U.S. Appl. No. 13/559,038, 13 pages.
Luke et al., "Apparatus, Method and Article for Authentication, Security and Control of Power Storage Devices, Such as Batteries," Office Action dated Feb. 25, 2014, for U.S. Appl. No. 14/023,344, 12 pages.
Luke et al., "Dynamically Limiting Vehicle Operation for Best Effort Economy," Office Action for U.S. Appl. No. 13/559,264, dated Feb. 12, 2014, 24 pages.
Wu et al., "Apparatus, Method and Article for a Power Storage Device Compartment," Office Action for U.S. Appl. No. 13/559,125, dated Feb. 24, 2014, 28 pages.
Wu et al., "Apparatus, Method and Article for Providing Information Regarding Availability of Power Storage Devices at a Power Storage Device Collection, Charging and Distribution Machine," Office Action dated Mar. 5, 2014, for U.S. Appl. No. 14/022,140, 8 pages.
Wu et al., "Apparatus, Method and Article for Providing Locations of Power Storage Device Collection, Charging and Distribution Machines," Office Action dated Mar. 5, 2014, for U.S. Appl. No. 14/022,147, 12 pages.
Chen et al., "Apparatus, Method and Article for Providing Vehicle Diagnostic Data," Notice of Allowance dated Nov. 3, 2014, for U.S. Appl. No. 13/559,390, 10 pages.
International Search Report and Written Opinion for corresponding International Application No. PCT/US2014/023539, dated Sep. 4, 2014, 12 pages.
Japanese Office Action with English Translation, dated Dec. 16, 2014, for corresponding JP Application No. 2014-523013, 11 pages.
Luke et al., "Apparatus, Method and Article for Authentication, Security and Control of Power Storage Devices, Such as Batteries," Office Action dated Aug. 21, 2014, for U.S. Appl. No. 14/023,344, 13 pages.
Luke, "Apparatus, Method and Article for Providing Information Regarding a Vehicle via a Mobile Device," Office Action for U.S. Appl. No. 14/017,081, dated Jul. 21, 2014, 42 pages.

Taylor et al., "Apparatus, Method and Article for Physical Security of Power Storage Devices in Vehicles," Office Action dated Dec. 10, 2014, for U.S. Appl. No. 14/012,845, 13 pages.
Wu et al., "Apparatus, Method and Article for Security of Vehicles," Office Action dated Oct. 2, 2014, for U.S. Appl. No. 13/671,144, 20 pages.
Wu et al., "Apparatus, Method and Article for a Power Storage Device Compartment," Office Action for U.S. Appl. No. 13/559,125, dated Sep. 9, 2014, 28 pages.
Wu et al., "Apparatus, Method and Article for Providing to a User Device Information Regarding Availability of Portable Electrical Energy Storage Devices At a Portable Electrical Storage Device Collection, Charging and Distribution Machine," U.S. Appl. No. 14/511,137, filed Oct. 9, 2014, 56 pages.
Wu et al., "Apparatus, Method and Article for Providing Locations of Power Storage Device Collection, Charging and Distribution Machines," Office Action dated Aug. 6, 2014, for U.S. Appl. No. 14/022,147, 17 pages.
Wu et al., "Apparatus, Method and Article for Providing Locations of Power Storage Device Collection, Charging and Distribution Machines," Notice of Allowance dated Nov. 25, 2014, for U.S. Appl. No. 14/022,147, 5 pages.
Chen et al., "Apparatus, Method and Article for Providing Vehicle Diagnostic Data," Notice of Allowance dated Jun. 23, 2015, for U.S. Appl. No. 14/609,201, 12 pages.
Chen et al., "Apparatus, Method and Article for Providing Vehicle Diagnostic Data," Office Action dated Jun. 3, 2015, for U.S. Appl. No. 14/179,442, 20 pages.
Extended European Search Report dated Apr. 24, 2015, for corresponding EP Application No. 12817097.4, 9 pages.
Huang et al., "Apparatus, Method and Article for Vehicle Turn Signals," Office Action dated May 14, 2015, for U.S. Appl. No. 14/079,894, 9 pages.
International Preliminary Report on Patentability and Written Opinion for corresponding International Patent Application No. PCT/US2013/070131, dated May 19, 2015, 13 pages.
International Search Report and Written Opinion dated Nov. 18, 2014, for corresponding International Application No. PCT/US2014/050000, 11 pages.
International Search Report and Written Opinion dated Feb. 16, 2015, for corresponding International Application No. PCT/US2014/063931, 14 pages.
Japanese Office Action with English Translation dated Mar. 31, 2015, for corresponding JP Application No. 2014-523014, 9 pages.
Japanese Office Action with English Translation dated Jun. 30, 2015, for corresponding JP Application No. 2014-523020, 15 pages.
English Translation of Japanese Office Action dated Feb. 17, 2015, for corresponding Japanese Patent Application No. 2014-523007, 7 pages.
Luke et al., "Apparatus, Method and Article for Redistributing Power Storage Devices, Such as Batteries, Between Collection, Charging and Distribution Machines," Office Action dated Mar. 13, 2015, for U.S. Appl. No. 13/559,091, 33 pages.
Luke et al., "Apparatus, Method and Article for Authentication, Security and Control of Power Storage Devices, Such as Batteries," Office Action dated Jun. 19, 2015, for U.S. Appl. No. 14/023,344, 9 pages.
Luke et al., "Apparatus, Method and Article for Collection, Charging and Distributing Power Storage Devices, Such as Batteries," Notice of Allowance dated Jun. 8, 2015, for U.S. Appl. No. 13/559,314, 12 pages.
Luke et al., "Apparatus, Method and Article for Reserving Power Storage Devices at Reserving Power Storage Device Collection, Charging and Distribution Machines," Office Action dated Jun. 23, 2015, for U.S. Appl. No. 13/559,064, 32 pages.
Luke et al., "Dynamically Limiting Vehicle Operation for Best Effort Economy," Office Action for U.S. Appl. No. 13/559,264, dated Jun. 15, 2015, 36 pages.
Luke et al., "Thermal Management of Components in Electric Motor Drive Vehicles," Notice of Allowance dated Jul. 28, 2014, for U.S. Appl. No. 13/559,259, 7 pages.

(56) References Cited

OTHER PUBLICATIONS

Luke, "Apparatus, Method and Article for Providing Information Regarding a Vehicle via a Mobile Device," Office Action dated Jul. 15, 2015, for U.S. Appl. No. 14/017,081, 61 pages.
Park, "A Comprehensive Thermal Management System Model for Hybrid Electric Vehicles," dissertation, The University of Michigan, 2011, 142 pages.
Taylor et al., "Apparatus, Method and Article for Physical Security of Power Storage Devices in Vehicles," Office Action dated Jun. 23, 2015, for U.S. Appl. No. 14/012,845, 11 pages.
Taylor et al., "Apparatus, Method and Article for Providing Vehicle Event Data," U.S. Appl. No. 61/901,660, filed Nov. 8, 2013, 58 pages.
Taylor et al., "Systems and Methods for Utilizing an Array of Power Storage Devices, Such as Batteries," U.S. Appl. No. 14/601,840, filed Jan. 21, 2015, 51 pages.
Wu et al., "Apparatus, Method and Article for Security of Vehicles," Office Action dated Jun. 4, 2015, for U.S. Appl. No. 13/674,144, 20 pages.
Wu et al., "Apparatus, Method and Article for a Power Storage Device Compartment," Office Action for U.S. Appl. No. 13/559,125, dated Jun. 16, 2015, 30 pages.
Wu et al., "Apparatus, Method and Article for Power Storage Device Failure Safety," Notice of Allowance dated Apr. 13, 2015, for U.S. Appl. No. 14/071,134, 10 pages.
Chinese Office Action dated Jul. 17, 2015, for corresponding CN Application No. 201280047017.1, 15 pages.
Chinese Office Action dated Jul. 30, 2015, for corresponding CN Application No. 201280046871.6, 25 page.
Communication pursuant to Rules 70(2) and 70a(2) EPC, for corresponding European Patent Application No. 12817141.0, dated Aug. 20, 2015, 1 page.
Communication pursuant to Rules 70(2) and 70a(2) EPC, for corresponding European Patent Application No. 12817696.3, dated Aug. 21, 2015, 1 page.
Communication pursuant to Rules 70(2) and 70a(2) EPC, for corresponding European Patent Application No. 12818447.0, dated Aug. 21, 2015, 1 page.
Extended European Search Report dated Aug. 3, 2015, for corresponding EP Application No. 12817141.0, 9 pages.
Extended European Search Report dated Aug. 5, 2015, for corresponding EP Application No. 12818447.0, 17 pages.
Extended European Search Report dated Aug. 5, 2015, for corresponding EP Application No. 12817392.9, 9 pages.
Extended European Search Report dated Aug. 5, 2015, for corresponding EP Application No. 12817696.3, 13 pages.
International Preliminary Report on Patentability dated Sep. 8, 2015, for corresponding International Application No. PCT/US2014/021369, 9 pages.
Japanese Office Action dated Sep. 1, 2015, for corresponding JP Application No. 2014-523005, with English Translation, 11 pages.
Japanese Office Action dated Sep. 8, 2015, for corresponding JP Application No. 2014-523018, with English Translation, 12 pages.
Japanese Office Action with English Translation dated Jul. 14, 2015 for corresponding Japanese application No. 2014-523007, 3 pages.
Luke et al., "Apparatus, Method and Article for Authentication, Security and Control of Power Storage Devices, Such as Batteries," Notice of Allowance dated Aug. 3, 2015, for U.S. Appl. No. 13/559,038, 13 pages.
Supplementary European Search Report dated Jul. 10, 2015, for corresponding EP Application No. 12847969.8-1503, 5 pages.

\* cited by examiner

| Benefits Customer profile level | Overall Battery Capacity | Battery Age | Battery Electrical Current Release Level | # of Previous Charge Cycles of Battery |
|---|---|---|---|---|
| 3 | high | young | high | low |
| 2 | medium | medium | medium | medium |
| 1 | low | old | low | high |

*FIG. 5*

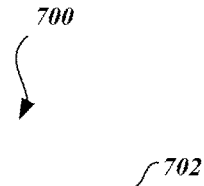

select a portable electrical energy storage device with higher performance characteristics than another portable electrical energy storage device in the portable electrical energy storage device collection, charging and distribution machine that would be selected for another user associated with another user profile that indicates a lower subscription level for use of the portable electrical energy storage device collection, charging and distribution machine

*FIG. 7*

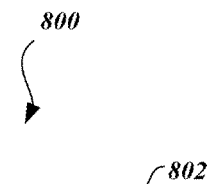

determine a driving profile of a diver by receiving information regarding the driving profile based on one or more of: accelerator readings of the driver which correlate to instances of high acceleration, and levels of current draw during a use of the driver of a portable electrical energy storage device

*FIG. 8*

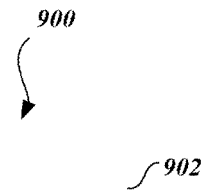

receive a signal indicative that a used portable electrical energy storage device has been received by the portable electrical energy storage device collection, charging and distribution machine from the user before releasing the portable electrical energy storage device

*FIG. 9*

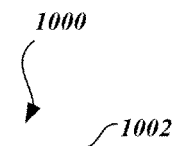

determine, based on the received user profile, a particular level of energy to release from the portable electrical energy storage device for use by the user configure a security system of the portable electrical energy storage device to release energy from the portable electrical energy storage device at the determined particular level for use by the user based on the received user profile

1102 select the portable electrical energy storage device based on a prioritization system between users that is configured to compare the received user profile to other user profiles.

*FIG. 11*

APPARATUS, METHOD AND ARTICLE FOR AUTHENTICATION, SECURITY AND CONTROL OF POWER STORAGE DEVICES, SUCH AS BATTERIES, BASED ON USER PROFILES

CROSS REFERENCE TO RELATED APPLICATIONS

This application claims the benefit under 35 U.S.C. 119(e) of the filing date of U.S. provisional patent application Ser. No. 61/511,900 entitled "APPARATUS, METHOD AND ARTICLE FOR COLLECTION, CHARGING AND DISTRIBUTING POWER STORAGE DEVICES, SUCH AS BATTERIES" and filed Jul. 26, 2011, U.S. provisional patent application Ser. No. 61/647,936 entitled "APPARATUS, METHOD AND ARTICLE FOR COLLECTION, CHARGING AND DISTRIBUTING POWER STORAGE DEVICES, SUCH AS BATTERIES" and filed May 16, 2012, U.S. provisional patent application Ser. No. 61/534,753 entitled "APPARATUS, METHOD AND ARTICLE FOR REDISTRIBUTING POWER STORAGE DEVICES, SUCH AS BATTERIES, BETWEEN COLLECTION, CHARGING AND DISTRIBUTION MACHINES" and filed Sep. 14, 2011, U.S. provisional patent application Ser. No. 61/534,761 entitled "APPARATUS, METHOD AND ARTICLE FOR AUTHENTICATION, SECURITY AND CONTROL OF POWER STORAGE DEVICES SUCH AS BATTERIES" and filed Sep. 14, 2011, U.S. provisional patent application Ser. No. 61/534,772 entitled "APPARATUS, METHOD AND ARTICLE FOR AUTHENTICATION, SECURITY AND CONTROL OF POWER STORAGE DEVICES, SUCH AS BATTERIES, BASED ON USER PROFILES" and filed Sep. 14, 2011, U.S. provisional patent application Ser. No. 61/511,887 entitled "THERMAL MANAGEMENT OF COMPONENTS IN ELECTRIC MOTOR DRIVE VEHICLES" and filed Jul. 26, 2011, U.S. provisional patent application Ser. No. 61/647,941 entitled "THERMAL MANAGEMENT OF COMPONENTS IN ELECTRIC MOTOR DRIVE VEHICLES" and filed May 16, 2012, U.S. provisional patent application Ser. No. 61/511,880 entitled "DYNAMICALLY LIMITING VEHICLE OPERATION FOR BEST EFFORT ECONOMY" and filed Jul. 26, 2011, U.S. provisional patent application Ser. No. 61/557,170 entitled "APPARATUS, METHOD, AND ARTICLE FOR PHYSICAL SECURITY OF POWER STORAGE DEVICES IN VEHICLES" and filed Nov. 8, 2011, U.S. provisional patent application Ser. No. 61/581,566 entitled "APPARATUS, METHOD AND ARTICLE FOR A POWER STORAGE DEVICE COMPARTMENT" and filed Dec. 29, 2011, U.S. provisional patent application Ser. No. 61/601,404 entitled "APPARATUS, METHOD AND ARTICLE FOR PROVIDING VEHICLE DIAGNOSTIC DATA" and filed Feb. 21, 2012, U.S. provisional patent application Ser. No. 61/601,949 entitled "APPARATUS, METHOD AND ARTICLE FOR PROVIDING LOCATIONS OF POWER STORAGE DEVICE COLLECTION, CHARGING AND DISTRIBUTION MACHINES" and filed Feb. 22, 2012, and U.S. provisional patent application Ser. No. 61/601,953 entitled "APPARATUS, METHOD AND ARTICLE FOR PROVIDING INFORMATION REGARDING AVAILABILITY OF POWER STORAGE DEVICES AT A POWER STORAGE DEVICE COLLECTION, CHARGING AND DISTRIBUTION MACHINE" and filed Feb. 22, 2012.

BACKGROUND

Technical Field

The present disclosure generally relates to the charging, selection and energy release from rechargeable electrical power storage devices (e.g., secondary batteries, supercapacitors or ultracapacitors), which may be suitable for use in a variety of fields or applications, for instance transportation and non-transportation uses.

Description of the Related Art

There are a wide variety of uses or applications for portable electrical power storage devices.

One such application is in the field of transportation. Hybrid and all electrical vehicles are becoming increasingly common. Such vehicles may achieve a number of advantages over traditional internal combustion engine vehicles. For example, hybrid or electrical vehicles may achieve higher fuel economy and may have little or even zero tail pipe pollution. In particular, all electric vehicles may not only have zero tail pipe pollution, but may be associated with lower overall pollution. For example, electrical power may be generated from renewable sources (e.g., solar, hydro). Also for example, electrical power may be generated at generation plants that produce no air pollution (e.g., nuclear plants). Also for example, electrical power may be generated at generation plants that burn relatively "clean burning" fuels (e.g., natural gas), which have higher efficiency than internal combustion engines, and/or which employ pollution control or removal systems (e.g., industrial air scrubbers) which are too large, costly or expensive for use with individual vehicles.

Personal transportation vehicles such as combustion engine powered scooters and/or motorbikes are ubiquitous in many places, for example in the many large cities of Asia. Such scooters and/or motorbikes tend to be relatively inexpensive, particular as compared to automobiles, cars or trucks. Cities with high numbers of combustion engine scooters and/or motorbikes also tend to be very densely populated and suffer from high levels of air pollution. When new, many combustion engine scooters and/or motorbikes are equipped with a relatively low polluting source of personal transportation. For instance, such scooters and/or motorbikes may have higher mileage ratings than larger vehicles. Some scooters and/or motorbikes may even be equipped with basic pollution control equipment (e.g., catalytic converter). Unfortunately, factory specified levels of emission are quickly exceeded as the scooters and/or motorbikes are used and either not maintained and/or as the scooters and/or motorbikes are modified, for example by intentional or unintentional removal of catalytic converters. Often owners or operators of scooters and/or motorbikes lack the financial resources or the motivation to maintain their vehicles.

It is known that air pollution has a negative effect on human health, being associated with causing or exacerbating various diseases (e.g., various reports tie air pollution to emphysema, asthma, pneumonia, cystic fibrosis as well as various cardiovascular diseases). Such diseases take large numbers of lives and severely reduce the quality of life of countless others.

BRIEF SUMMARY

Zero tail pipe pollution alternatives to combustion engines would greatly benefit air quality, and hence the health of large populations.

While the zero tail pipe emissions benefit of all-electric vehicles are appreciated, adoption of all-electric vehicles by large populations has been slow. One of the reasons appears to be the cost, particularly the cost of secondary batteries.

Another one of the reasons appears to be the limited driving range available on a single charge of a battery, and the relatively long time (e.g., multiple hours) necessary to recharge a secondary battery when depleted.

The approaches described herein may address some of the issues which have limited adoption of zero tail pipe emission technology, particularly in densely crowded cities, and in populations with limited financial resources.

For example, some of the approaches described herein employ collection, charging and distribution machines, which may be otherwise be termed as kiosks or vending machines, to collect, charge and distribute electrical power storage devices (e.g., batteries, supercapacitors or ultracapacitors). Such machines may be distributed about a city or other region at a variety of locations, such as convenience stores or existing gas or petrol filling stations.

The collection, charging and distribution machines may maintain a stock of fully charged or almost fully charged electrical storage devices for use by end users. The collection, charging and distribution machines may collect, receive or otherwise accept depleted electrical storage devices, for example as returned by end users, recharging such for reuse by subsequent end users.

Thus, as a battery or other electrical power storage device reaches or approaches the end of its stored charge, an end user may simply replace, exchange or otherwise swap batteries or other electrical power storage devices. This may address issues related to cost, as well as limited range and relatively long recharging times.

As previously noted, secondary batteries and other electrical power storage devices are relatively expensive. Thus, it is beneficial to stock the least number of electrical power storage devices possible, while still ensuring that demand for such is satisfied.

For these reasons, the ability to have electrical power storage devices available according to particular user needs and preferences is important to commercial success of any such endeavor.

A method of operating a controller of a portable electrical energy storage device collection, charging and distribution machine may be summarized as including receiving, by the controller of the portable electrical energy storage device collection, charging and distribution machine, a request for a portable electrical energy storage device from a user at a portable electrical energy storage device collection, charging and distribution machine; automatically selecting, by the controller of the portable electrical energy storage device collection, charging and distribution machine, a portable electrical energy storage device in the portable electrical energy storage device collection, charging and distribution machine having particular performance characteristics, the selection based on a received user profile of the user; and automatically releasing the selected portable electrical energy storage device for the user.

The automatically selecting may include selecting a portable electrical energy storage device with higher performance characteristics than another portable electrical energy storage device in the portable electrical energy storage device collection, charging and distribution machine that would be selected for another user associated with another user profile that indicates a lower subscription level for use of the portable electrical energy storage device collection, charging and distribution machine. The performance characteristics may include one or more of: an age of the portable electrical energy storage device, a capacity of the portable electrical energy storage device, a current charge level of the portable electrical energy storage device, a percentage of charge level to a charge capacity of the portable electrical energy storage device, a total cumulative number of charge cycles that the portable electrical energy storage device has experienced to date, number or frequency of deep discharges of the portable electrical energy storage device, temperature exposure of the portable electrical energy storage device, a value that represents number or frequency of charge cycles of the portable electrical energy storage device, whether the portable electrical energy storage device has been used by drivers with aggressive driving profiles.

The method of operating a controller of a portable electrical energy storage device collection, charging and distribution machine may further include determining, by the configured controller of the portable electrical energy storage device collection, charging and distribution machine, a driving profile of a driver by receiving information regarding the driving profile based on one or more of: accelerator readings of the driver which correlate to instances of high acceleration, and levels of current draw during a use of the driver of a portable electrical energy storage device.

The method of operating a controller of a portable electrical energy storage device collection, charging and distribution machine may further include receiving a signal indicative that a used portable electrical energy storage device has been received by the portable electrical energy storage device collection, charging and distribution machine from the user before releasing the portable electrical energy storage device.

The method of operating a controller of a portable electrical energy storage device collection, charging and distribution machine may further include determining, by the controller of the portable electrical energy storage device collection, charging and distribution machine, based on the received user profile, a particular level of energy to release from the portable electrical energy storage device for use by the user; and configuring, by the controller of the portable electrical energy storage device collection, charging and distribution machine, a security system of the portable electrical energy storage device to release energy from the portable electrical energy storage device at the determined particular level for use by the user based on the received user profile.

The configuring may occur before the releasing of the portable electrical energy storage device.

The method of operating a controller of a portable electrical energy storage device collection, charging and distribution machine may further include receiving the user profile over a wireless connection.

The receiving the user profile may include receiving the user profile via a mobile device of the user. The automatically selecting the portable electrical energy storage device may include selecting the portable electrical energy storage device based on past route information indicative of a number of aspects of a number of past routes taken by the user as indicated on the user profile. The automatically selecting the portable electrical energy storage device may include selecting the portable electrical energy storage device based on one or more vehicle specifications as indicated on the user profile. The automatically selecting the portable electrical energy storage device may include selecting the portable electrical energy storage device based on a prioritization system between users that is configured to compare the received user profile to other user profiles.

A portable electrical energy storage device collection, charging and distribution machine may be summarized as including a portable electrical energy storage device charger; a portable electrical energy storage device releasing system; a security system coupled to the releasing system; a user interface; and a controller coupled to the portable electrical energy storage device charger, the releasing system, the user interface and the security system, the controller including: at least one processor; at least one communications module coupled to the at least one processor, wherein the at least one processor is configured to: select for a user a portable electrical energy storage device having particular performance characteristics, the selection based on a received user profile of the user; and automatically release the selected portable electrical energy storage device for use by the user.

The at least one processor may be coupled to receive a request for a portable electrical energy storage device from the user at the portable electrical energy storage device collection, charging and distribution machine. The selection of the portable electrical energy storage device may be further based on an indication in the user profile that the user prefers to be offered a choice for a higher performance portable electrical energy storage device than other available vehicle batteries for a premium price at a time of the request. The at least one processor may prompt the user with a choice for the portable electrical energy storage device collection, charging and distribution machine to select for the user a higher performance portable electrical energy storage device than other available vehicle batteries; may receive input in response to the prompt; and may perform the portable electrical energy storage device selection according to the input. The selection for the user of the portable electrical energy storage device may include selection of a portable electrical energy storage device with higher performance characteristics than another portable electrical energy storage device in the portable electrical energy storage device collection, charging and distribution machine that would be selected for another user associated with another user profile that indicates a lower subscription level for use of the portable electrical energy storage device collection, charging and distribution machine. The performance characteristics may include one or more of: an age of the portable electrical energy storage device, a capacity of the portable electrical energy storage device, a current charge level of the portable electrical energy storage device, a percentage of charge level to a charge capacity of the portable electrical energy storage device, a total cumulative number of charge cycles that the portable electrical energy storage device has explained to date, number or frequency of deep discharges of the portable electrical energy storage device, temperature exposure of the portable electrical energy storage device, a value that represents number or frequency of charge cycles of the portable electrical energy storage device, whether the portable electrical energy storage device has been used by drivers with aggressive driving profiles. The at least one processor may be further configured to determine a driving profile of a driver by receiving information regarding the driving profile based on one or more of: accelerator readings of the driver which correlate to instances of high acceleration, and levels of current draw during a use of the driver of a portable electrical energy storage device. The at least one processor may be further configured to receive a signal indicative that a used portable electrical energy storage device has been received by the portable electrical energy storage device collection, charging and distribution machine from the user before releasing the portable electrical energy storage device.

A non-transitory computer-readable medium may be summarized as a non-transitory computer-readable medium that stores instructions that when executed by at least one computer system cause the at least one computer system to perform: receiving a request for a portable electrical energy storage device from a user at a portable electrical energy storage device collection, charging and distribution machine; automatically selecting a portable electrical energy storage device in the portable electrical energy storage device collection, charging and distribution machine having particular performance characteristics; and controlling automatic releasing of the selected portable electrical energy storage device to the user.

The instructions that when executed by at least one computer system may further cause the at least one computer system to receive a user profile of the user. The automatically selecting may be based on the received user profile.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn, are not intended to convey any information regarding the actual shape of the particular elements, and have been solely selected for ease of recognition in the drawings.

FIG. 5 is a chart showing an example of a mapping of customer profiles to particular portable electrical energy storage device options, according to one non-limiting illustrated embodiment.

FIG. 7 is a flow diagram showing a low level method of operating the portable electrical energy storage device collection, charging and distribution machine controller of FIG. 2, according to one non-limiting illustrated embodiment, including selecting a portable electrical energy storage device with higher performance characteristics, useful in the method of FIG. 6.

FIG. 8 is a flow diagram showing a low level method of operating the portable electrical energy storage device collection, charging and distribution machine controller of FIG. 2, according to one non-limiting illustrated embodiment, including determining a driving profile of a driver, useful in the method of FIG. 6.

FIG. 9 is a flow diagram showing a low level method of operating the portable electrical energy storage device collection, charging and distribution machine controller of FIG.

Figure 6:
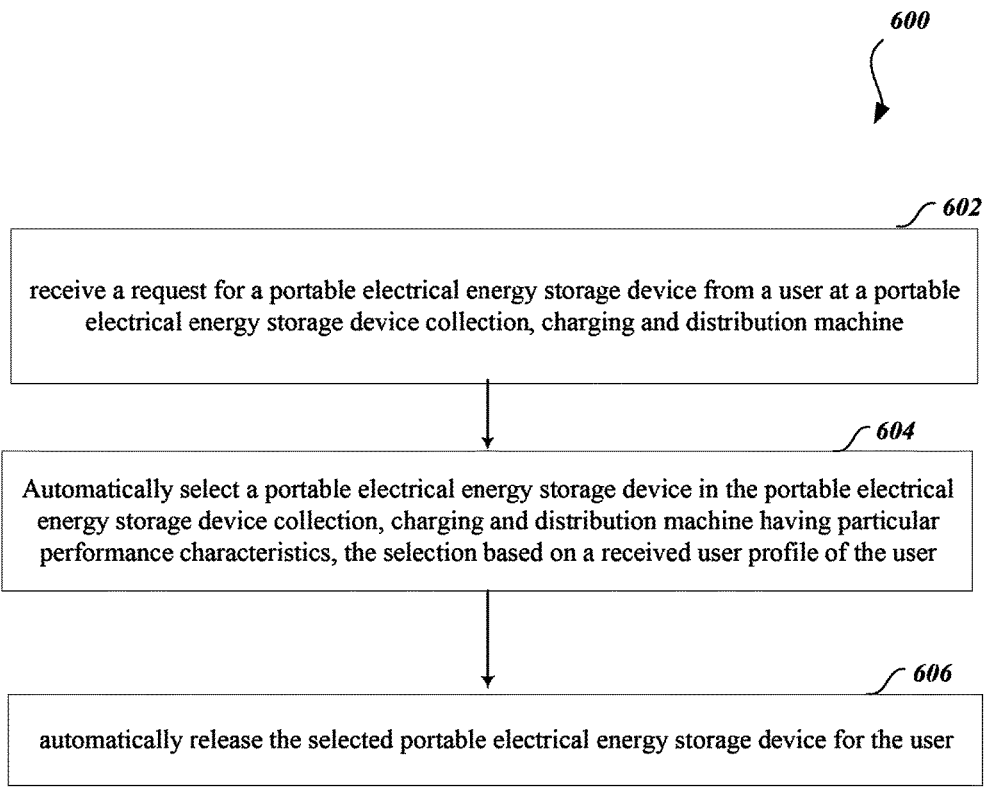
FIG. 6 is a flow diagram showing a high level method of operating a controller of a portable electrical energy storage device collection, charging and distribution machine of FIG. 2, according to one non-limiting illustrated embodiment.

2, according to one non-limiting illustrated embodiment, including a process of releasing the portable electrical energy storage device to the user, useful in the method of FIG. 6.

Figure 2:
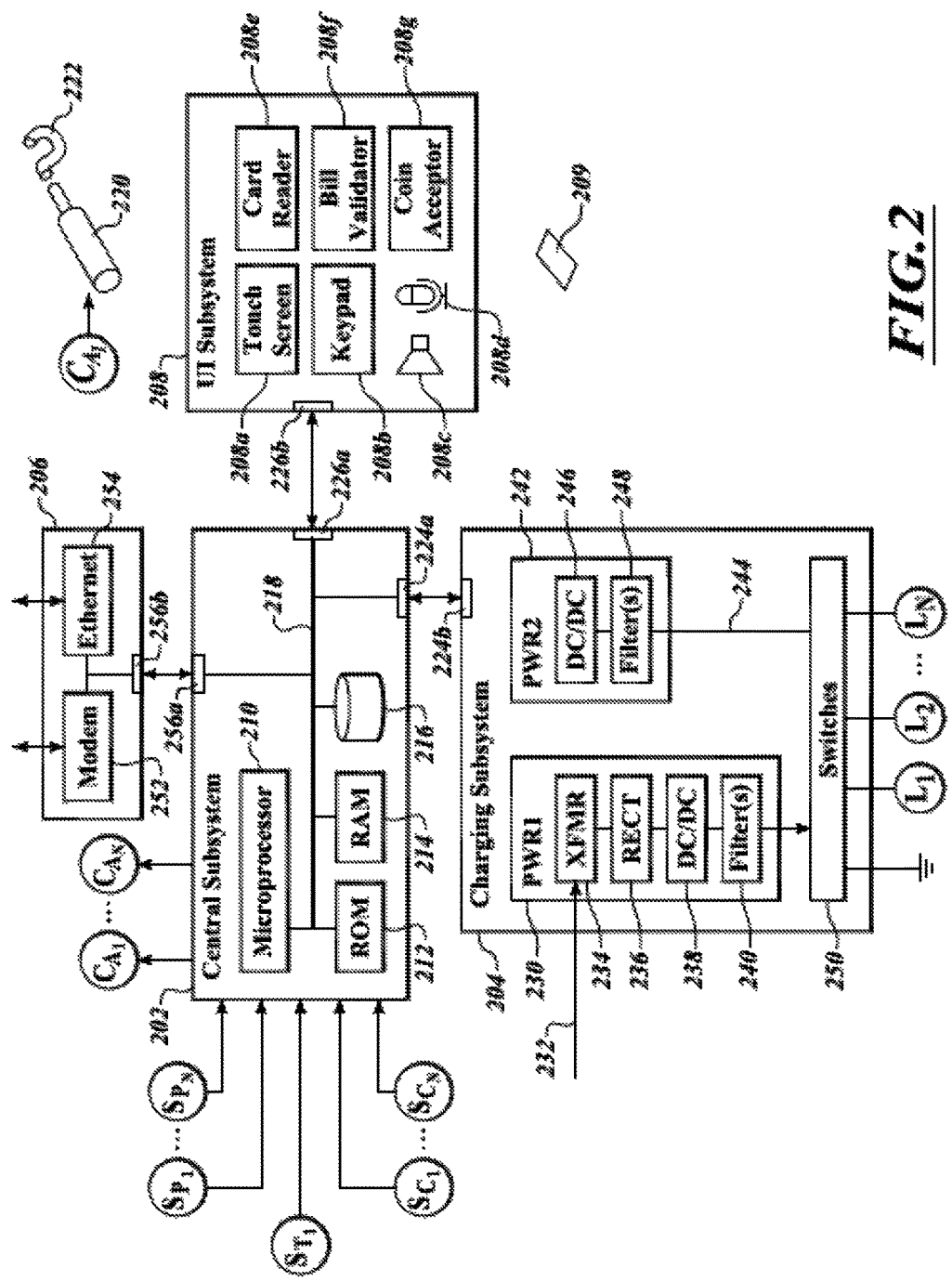
FIG. 2 is a block diagram of the collection, charging and distribution machine of FIG. 1, according to one non-limiting illustrated embodiment.

FIG. 10 is a flow diagram showing a low level method of operating the portable electrical energy storage device collection, charging and distribution machine controller of FIG. 2, according to one non-limiting illustrated embodiment, including configuring a security system of the portable electrical energy storage device, useful in the method of FIG. 6.

FIG. 11 is a flow diagram showing a low level method of operating the portable electrical energy storage device collection, charging and distribution machine controller of FIG. 2, according to one non-limiting illustrated embodiment, including selecting the portable electrical energy storage device based on a prioritization system, useful in the method of FIG. 6.

DETAILED DESCRIPTION

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with vending apparatus, batteries, supercapacitors or ultracapacitors, power converters including but not limited to transformers, rectifiers, DC/DC power converters, switch mode power converters, controllers, and communications systems and structures and networks have not been shown or described in detail to avoid unnecessarily obscuring descriptions of the embodiments.

Unless the context requires otherwise, throughout the specification and claims which follow, the word "comprise" and variations thereof, such as, "comprises" and "comprising" are to be construed in an open, inclusive sense that is as "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment.

The use of ordinals such as first, second and third does not necessarily imply a ranked sense of order, but rather may only distinguish between multiple instances of an act or structure.

Reference to portable electrical power storage device means any device capable of storing electrical power and releasing stored electrical power including but not limited to batteries, supercapacitors or ultracapacitors. Reference to batteries means chemical storage cell or cells, for instance rechargeable or secondary battery cells including but not limited to nickel cadmium alloy or lithium ion battery cells.

The headings and Abstract of the Disclosure provided herein are for convenience only and do not interpret the scope or meaning of the embodiments.

Figure 1:
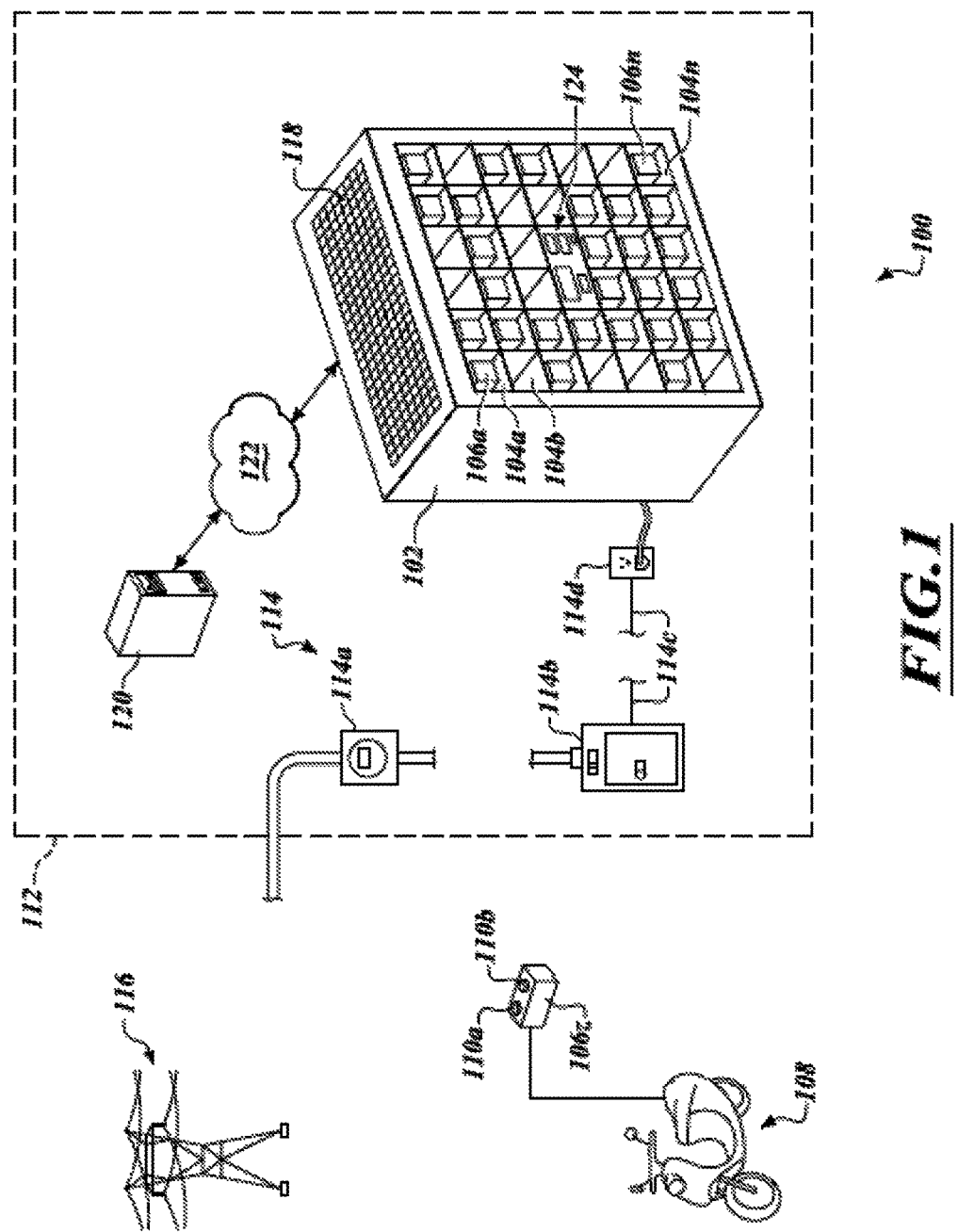
FIG. 1 is a schematic view of a collection, charging and distribution machine along with a number of electrical power storage devices according to one non-limiting illustrated embodiment, along with an electric scooter or motorbike, and an electrical service provided via an electrical grid.

FIG. 1 shows an environment 100 including a collection, charging and distribution machine 102, according to one illustrated embodiment.

The collection, charging and distribution machine 102 may take the form of a vending machine or kiosk. The collection, charging and distribution machine 102 has a plurality of receivers, compartments or receptacles 104a, 104b-104n (only three called out in FIG. 1, collectively 104) to removably receive portable electrical energy storage devices (e.g., batteries, supercapacitors or ultracapacitors) 106a-106n (collectively 106) for collection, charging and distribution. As illustrated in FIG. 1, some of the receivers 104 are empty, while other receivers 104 hold portable electrical energy storage devices 106. While FIG. 1 shows a single portable electrical energy storage device 106 per receiver 104, in some embodiments each receiver 104 may hold two or even more portable electrical energy storage devices 106. For example, each of the receivers 104 may be sufficiently deep to receive three portable electrical energy storage devices 106. Thus, for example, the collection, charging and distribution machine 102 illustrated in FIG. 1 may have a capacity capable of simultaneously holding 40, 80 or 120 portable electrical energy storage devices 106 and may include an inventory of portable electrical energy storage devices 106 having various performance characteristics, qualities and other features for selection by users or for automatic selection based on user preferences or profiles.

The portable electrical energy storage devices 106 may take a variety of forms, for example batteries (e.g., array of battery cells) or supercapacitors or ultracapacitors (e.g., array of ultracapacitor cells) and may have various different performance levels and characteristics. For example, the portable electrical energy storage devices 106z may take the form of rechargeable batteries (i.e., secondary cells or batteries). The portable electrical energy storage devices 106z may, for instance, be sized to physically fit, and electrically power, personal transportation vehicles, such as all-electric scooters or motorbikes 108. As previously noted, combustion engine scooters and motorbikes are common in many large cities, for example in Asia, Europe and the Middle East. The ability to conveniently access charged batteries throughout a city or region may allow the use of all-electric scooters and motorbikes 108 in place of combustion engine scooters and motorbikes, thereby alleviating air pollution, as well as reducing noise.

The portable electrical energy storage devices 106 (only visible for portable electrical energy storage device 106z) may include a number of electrical terminals 110a, 110b (two illustrated, collectively 110), accessible from an exterior of the portable electrical energy storage device 106z. The electrical terminals 110 allow charge to be delivered from the portable electrical energy storage device 106z, as well as allow charge to be delivered to the portable electrical energy storage device 106z for charging or recharging the same. While illustrated in FIG. 1 as posts, the electrical terminals 110 may take any other form which is accessible from an exterior of the portable electrical energy storage device 106z, including electrical terminals positioned within slots in a battery housing. As the portable electrical energy storage devices 106 may be lent, leased, and/or rented out to the public, it is desirable to control how and in what circumstances the portable electrical energy storage devices 106 may be charged and/or release energy, even while outside the collection, charging and distribution machine 102 or otherwise in the possession of users. This control of the portable electrical energy storage devices 106 helps to prevent theft and/or misuse and also enables control of various performance levels of various portable electrical energy storage devices 106. These performance levels may be based on preferences of a user, a subscription level of the user, or other aspects of a user profile. Systems and methods for charging the portable electrical energy storage devices 106, including a security system for controlling such charging and energy release according to user profiles and preferences, are described in more detail below with reference to FIGS. 2-7, and are useful in the overall system for collection, charging and distribution of portable electrical energy storage devices 106 described herein.

The collection, charging and distribution machine 102 is positioned at some location 112 at which the collection, charging and distribution machine 102 is conveniently and easily accessible by various end users. The location may take any of a large variety of forms, for example, a retail environment such as a convenience store, supermarket, gas or petrol station, or service shop. Alternatively, the collection, charging and distribution machine 102 may stand alone at a location 112 not associated with an existing retail or other business, for example in public parks or other public places. Thus, for example, collection, charging and distribution machines 102 may be located at each store of a chain of convenience stores throughout a city or region. Such may advantageously rely on the fact that convenience stores are often sited or distributed based on convenience to the target population or demographic. Such may advantageously rely on pre-existing leases on storefronts or other retail locations to allow an extensive network of collection, charging and distribution machines 102 to be quickly developed in a city or region. Quickly achieving a large network which is geographically well distributed to serve a target population enhances the ability to depend on such a system and likely commercial success of such an effort.

The location 112 may include an electrical service 114 to receive electrical power from a generating station (not shown) for example via a grid 116. The electrical service 114 may, for example, include one or more of an electrical service meter 114*a*, a circuit panel (e.g., circuit breaker panel or fuse box) 114*b*, wiring 114*c*, and electrical outlet 114*d*. Where the location 112 is an existing retail or convenience store, the electrical service 114 may be an existing electrical service, so may be somewhat limited in rating (e.g., 120 volts, 240 volts, 220 volts, 230 volts, 15 amps).

Neither the operator of the retail location 112, nor the owner, distributor or operator of the collection, charging and distribution machine 102 may wish to bear the costs of upgrading the electrical service 114. Yet, quick charging is desired in order to maintain an adequate supply of portable electrical energy storage devices 106 available for use by end users.

Optionally, the collection, charging and distribution machine 102 may include or be coupled to a source of renewable electrical power. For example, where installed in an outside location the collection, charging and distribution machine 102 may include an array of photovoltaic (PV) cells 118 to produce electrical power from solar insolation. Alternatively, the collection, charging and distribution machine 102 may be electrically coupled to a microturbine (e.g., wind turbine) or PV array positioned elsewhere at the location 112, for instance on a roof top or pole mounted at a top of a pole (not shown).

The collection, charging and distribution machine 102 may be communicatively coupled to one or more remotely located computer systems, such as back end or back office systems (only one shown) 120. The back end or back office systems 120 may collect data from and/or control a plurality of collection, charging and distribution machine 102 distributed about an area, such as a city. The communications may occur over one or more communications channels including one or more networks 122, or non-networked communications channels. Communications may be over one or more wired communications channels (e.g., twisted pair wiring, optical fiber), wireless communications channels (e.g., radio, microwave, satellite, 801.11 compliant). Networked communications channels may include one or more local area networks (LANs), wide area networks (WANs), extranets, intranets, or the Internet including the Worldwide Web portion of the Internet.

The collection, charging and distribution machine 102 may include a user interface 124. The user interface may include a variety of input/output (I/O) devices to allow an end user to interact with the collection, charging and distribution machine 102. Various I/O devices are called out and described in reference to FIG. 2, which follows.

FIG. 2 shows the collection, charging and distribution machine 102 of FIG. 1, according to one illustrated embodiment.

The collection, charging and distribution machine 102 includes a control subsystem 202, a charging subsystem 204, a communications subsystem 206, and a user interface subsystem 208.

The control subsystem 202 includes a controller 210, for example a microprocessor, microcontroller, programmable logic controller (PLC), programmable gate array (PGA), application specific integrated circuit (ASIC) or another controller capable of receiving signals from various sensors, performing logical operations, and sending signals to various components. Typically, the controller 210 may take the form of a microprocessor (e.g., INTEL, AMD, ATOM). The control subsystem 202 may also include one or more non-transitory processor- or computer-readable storage media, for example read only memory (ROM) 212, random access memory (RAM) 214, and data store 216 (e.g., solid-state storage media such as flash memory or EEPROM, spinning storage media such as hard disk). The non-transitory processor- or computer-readable storage media 212, 214, 216 may be in addition to any non-transitory storage medium (e.g., registers) which is part of the controller 210. The control subsystem 202 may include one or more buses 218 (only one illustrated) coupling various components together, for example one or more power buses, instruction buses, data buses, etc.

As illustrated, the ROM 212, or some other one of the non-transitory processor- or computer-readable storage media 212, 214, 216, stores instructions and/or data or values for variables or parameters. The sets of data may take a variety of forms, for example a lookup table, a set of records in a database, etc. The instructions and sets of data or values are executable by the controller 110. Execution of the instructions and sets of data or values causes the controller 110 to perform specific acts to cause the collection, charging and distribution machine 102 to collect, charge, select and distribute portable energy storage devices. Specific operation of the collection, charging and distribution machine 102 is described herein and also below with reference to various flow diagrams (FIGS. 6-11).

The controller 210 may use RAM 214 in a conventional fashion, for volatile storage of instructions, data, etc. The controller 210 may use data store 216 to log or retain information, for example, user profiles, telemetric information related to collection, charging and/or distribution or collection of the portable electric power storage devices 106 and/or operation of the collection, charging and distribution machine 102 itself. The instructions are executable by the controller 210 to control operation of the collection, charging and distribution machine 102 in response to end user or operator input, and using data or values for the variables or parameters.

The control subsystem 202 receives signals from various sensors and/or other components of the collection, charging and distribution machine 102 which include information that characterizes or is indicative of operation, status, or condition of such other components. Sensors are represented in FIG. 2 by the letter S appearing in a circle along with appropriate subscript letters.

For example, one or more position sensors $S_{P1}$-$S_{PN}$ may detect the presence or absence of portable electrical power storage device 106 at each of the receivers 104. The position sensors $S_{P1}$-$S_{PN}$ may take a variety of forms. For example, the position sensors $S_{P1}$-$S_{PN}$ may take the form of mechanical switches that are closed, or alternatively opened, in response to contact with a portion of a respective portable electrical power storage device 106 when the portable electrical power storage device 106 is inserted into the receiver 104. Also for example, the position sensors $S_{P1}$-$S_{PN}$ may take the form of optical switches (i.e., optical source and receiver) that are closed, or alternatively opened, in response to contact with a portion of a respective portable electrical power storage device 106 when the portable electrical power storage device 106 is inserted into the receiver 104. Also for example, the position sensors $S_{P1}$-$S_{PN}$ may take the form of electrical sensors or switches that are closed, or alternatively opened, in response to detecting a closed circuit condition created by contact with the terminals 110 of a respective portable electrical power storage device 106 when the portable electrical power storage device 106 is inserted into the receiver 104, or an open circuit condition that results from the lack of a respective portable electrical power storage device 106 in the receiver 104. These examples are intended to be non-limiting, and it is noted that any other structures and devices for detecting the presence/absence or even the insertion of the portable electrical power storage devices 106 into receivers may be employed.

For example, one or more charge sensors $S_{C1}$-$S_{CN}$ may detect charge of the portable electrical power storage devices 106 at each of the receivers 104. Charge sensors $S_{C1}$-$S_{CN}$ may detect the amount of charge stored by the portable electrical power storage devices 106. Charge sensors $S_{C1}$-$S_{CN}$ may additionally detect an amount of charge and/or rate of charging being supplied to ones of the portable electrical power storage devices 106 at each of the receivers 104. Such may allow assessment of current (i.e., temporal) charge condition or status of each portable electrical power storage device 106, as well as allow feedback control over charging of same, including control over rate of charging. Charge sensors $S_{C1}$-$S_{CN}$ may include any variety of current and/or voltage sensors.

For example, one or more charge sensors $S_{T1}$ (only one shown) may detect or sense a temperature at the receivers 104 or in the ambient environment.

The control subsystem 202 provides signals to various actuators and/or other components responsive to control signals, which signals include information that characterizes or is indicative of an operation the component is to perform or a state or condition in which the components should enter. Control signals, actuators or other components responsive to control signals are represented in FIG. 2 by the letter C appearing in a circle along with appropriate subscript letters.

For example, one or more engine control signals $C_{A1}$-$C_{AN}$ may affect the operation of one or more actuators 220 (only one illustrated). For instance, a control signal $C_{A1}$ may cause movement of an actuator 220 between a first and a second position or change a magnetic field produced by the actuator 220. The actuator 220 may take any of a variety of forms, including but not limited to a solenoid, an electric motor such as a stepper motor, or an electromagnet. The actuator 220 may be coupled to operate a latch, lock or other retainer mechanism 222. The latch, lock or other retainer mechanism 222 may selectively secure or retain one or more portable electrical power storage devices 106 (FIG. 1) in the receiver 104 (FIG. 1). For instance, the latch, lock or other retainer mechanism 222 may physically couple to a complimentary structure that is part of a housing of the portable electrical power storage devices 106 (FIG. 1). Alternatively, the latch, lock or other retainer mechanism 222 may magnetically couple to a complimentary structure that is part of a housing of the portable electrical power storage devices 106 (FIG. 1). Also for instance, the latch, lock or other mechanism may open a receiver 104 (FIG. 1), or may allow a receiver 104 to be opened, to receive a partially or fully discharged portable electrical power storage device 106 for charging. For example, the actuator may open and/or close a door to the receiver 104 (FIG. 1), to selectively provide access to a portable electrical power storage device 106 (FIG. 1) received therein. Also for example, the actuator may open and/or close a latch or lock, allowing an end user to open and/or close a door to the receiver 104 (FIG. 1), to selectively provide access to a portable electrical power storage device 106 (FIG. 1) received therein.

The control subsystem 202 may include one or more ports 224a to provide control signals to one or more ports 224b of the charging subsystem 206. The ports 224a, 224b may provide bi-directional communications. The control subsystem 202 may include one or more ports 226a to provide control signals to one or more ports 226b of the user interface subsystem 208. The ports 226a, 226b may provide bi-directional communications.

The charging subsystem 204 includes various electrical and electronic components to charge portable electrical power storage devices 106 when positioned or received in the receivers 104. For example, the charging subsystem 204 may include one or more power buses or power bus bars, relays, contactors or other switches (e.g., insulated gate bipolar transistors or IGBTs, metal oxide semiconductor transistors or MOSFETs), rectifier bridge(s), current sensors, ground fault circuitry, etc. The electrical power is supplied via contacts that can take any of a variety of forms, for instance terminals, leads, posts, etc. The contacts allow electrical coupling of various components. Some possible implementations are illustrated in FIG. 2. Such is not intended to be exhaustive. Additional components may be employed while other components may be omitted.

The illustrated charging subsystem 204 includes a first power converter 230 that receives electrical power from the electrical service 114 (FIG. 1) via a line or cord 232. The power will typically be in the form of single, two or three phase AC electrical power. As such, the first power converter 230 may need to convert and otherwise condition the electrical power received via the electrical services 114 (FIG. 1), for example for rectifying an AC waveform to DC, transforming voltage, current, phase, as well as reducing transients and noise. Thus, the first power converter 230 may include a transformer 234, rectifier 236, DC/DC power converter 238, and filter(s) 240.

The transformer 234 may take the form of any variety of commercially available transformers with suitable ratings for handling the power received via the electrical service 114 (FIG. 1). Some embodiments may employ multiple transformers. The transformer 234 may advantageously provide galvanic isolation between the components of the collection, charging and distribution machine 102 and the grid 116 (FIG. 1). The rectifier 236 may take any of variety of forms, for example a full bridge diode rectifier or a switch mode rectifier. The rectifier 236 may be operated to transform AC electrical power to DC electrical power. The DC/DC power converter 238 may be any of a large variety of forms. For example, DC/DC power converter 238 may take the form a switch mode DC/DC power converter, for instance employing IGBTs or MOSFETs in a half or full bridge configuration, and may include one or more inductors. The DC/DC power converter 238 may have any number of topologies including a boost converter, buck converter, synchronous buck converter, buck-boost converter or fly-back converter. The filter(s) 240 may include one or more capacitors, resistors, Zener diodes or other elements to suppress voltage spikes, or to remove or reduce transients and/or noise.

The illustrated charging subsystem 204 may also receive electrical power from a renewable power source, for example the PV array 118 (FIG. 1). Such may be converted or conditioned by the first power converter 230, for example being supplied directly to the DC/DC power converter 238, bypassing the transformer 236 and/or rectifier 236. Alternatively, the illustrated charging subsystem 204 may include a dedicated power converter to convert or otherwise condition such electrical power.

The illustrated charging subsystem 204 may optionally include second power converter 242 that receives electrical power from one or more portable electrical power storage devices 106 (FIG. 1) via one or more lines 244, for charging other ones of the portable electrical power storage devices 106. As such, the second power converter 242 may need to convert and/or otherwise condition the electrical power received from portable electrical power storage devices 106, for example optionally transforming voltage or current, as well as reducing transients and noise. Thus, the second power converter 242 may optionally include a DC/DC power converter 246 and/or filter(s) 248. Various types of DC/DC power converters and filters are discussed above.

The illustrated charging subsystem 204 includes a plurality of switches 250 responsive to the control signals delivered via ports 224a, 224b from the control subsystem 202. The switches may be operable to selectively couple a first number or set of portable electrical power storage devices 106 to be charged from electrical power supplied by both the electrical service via the first power converter 230 and from electrical power supplied by a second number or set of portable electrical power storage devices 106. The first number or set of portable electrical power storage devices 106 may include a single portable electrical power storage device 106, two, or even more portable electrical power storage devices 106. The second number or set of portable electrical power storage devices 106 may include a single portable electrical power storage device 106, two, or even more portable electrical power storage devices 106. The portable electrical power storage devices 106 are represented in FIG. 2 as loads $L_1, L_2$-$L_N$.

The communications subsystem 206 may additionally include one or more communications modules or components which facilitate communications with the various components of a back end or back office system 120 (FIG. 1) and/or various components of the portable electrical power storage devices 106. The communications subsystem 206 may, for example, include one or more modems 252 or one or more Ethernet or other types of communications cards or components 254. A port 256a of the control subsystem 202 may communicatively couple the control subsystem 202 with a port 256b of the communications subsystem 206. The communications subsystem 206 may provide wired and/or wireless communications. For example, the communications subsystem 206 may provide components enabling short range (e.g., via Bluetooth, near field communication (NFC), radio frequency identification (RFID) components and protocols) or longer range wireless communications (e.g., over a wireless LAN, satellite, or cellular network) with various other devices external to the collection, charging and distribution machine 102, including the portable electrical energy storage devices 106. For example, the portable electrical energy storage devices 106 stored within the collection, charging and distribution machine may have particular performance characteristics, model information, storage capacity information, use history, etc. that may be acquired by the collection, charging and distribution machine via communications subsystem 206 from the portable electrical energy storage device. Also, such information may be collected via a sensor or other medium that connects to the portable electrical energy storage device stored within the collection, charging and distribution machine. Also, under direction of the control subsystem 202, the collection, charging and distribution machine may provide instructions to or otherwise program an portable electrical energy storage device stored within the collection, charging and distribution machine to perform at particular levels (e.g., release energy at particular levels) according to user preferences, a user profile or other factors.

The communications subsystem 206 may include one or more ports, wireless receivers, wireless transmitters or wireless transceivers to provide wireless signal paths to the various remote components or systems. The remote communications subsystem 206 may include one or more bridges or routers suitable to handle network traffic including switched packet type communications protocols (TCP/IP), Ethernet or other networking protocols.

The user interface system 208 includes one or more user input/output (I/O) components. For example, user interface system 208 may include a touch screen display 208a, operable to present information and a graphical user interface (GUI) to an end user and to receive indications of user selections. The user interface system 208 may include a keyboard or keypad 208b, and/or a cursor controller (e.g., mouse, trackball, trackpad) (not illustrated) to allow an end user to enter information and/or select user selectable icons in a GUI. The user interface system 208 may include a speaker 208c to provide aural messages to an end user and/or a microphone 208d to receive spoken user input such as spoken commands.

The user interface system 208 may include a card reader 208e to read information from card type media 209. The card reader 208e may take a variety of forms. For instance, the card reader 208e may take the form of, or include, a magnetic stripe reader for reading information encoded in a magnetic stripe carried by a card 209. For instance, the card reader 208e may take the form of, or include, a machine-readable symbol (e.g., barcode, matrix code) card reader for reading information encoded in a machine-readable symbol carried by a card 209. For instance, the card reader 208e may take the form of, or include, a smart card reader for reading information encoded in a non-transitory medium carried by a card 209. Such may, for instance, include media employing radio frequency identification (RFID) transponders or electronic payment chips (e.g., near filed communications (NFC) chips). Thus, the card reader 208e may be able to read information (e.g., a user profile and/or authentication credentials) from a variety of card media 209, for instance credit cards, debit cards, gift cards, prepaid cards, as well as identification media such as drivers licenses. The card reader 208e may also be able to read information encoded in a non-transitory medium carried by the portable electrical energy storage devices 106, and may also include RFID transponders, transceivers, NFC chips and/or other communication devices to communicate information to the portable electrical energy storage devices 106 (e.g., for authentication of the portable electrical energy storage devices 106 and/or authentication of the collection, charging and distribution machine 102 to the portable electrical energy storage devices 106).

The user interface system 208 may include a bill acceptor 208*f* and a validator and/or coin acceptor 208*g* to accept and validate cash payments. Such may be highly useful in servicing populations who lack access to credit. Bill acceptor and validator 208*f* and/or coin acceptor 208*g* may take any variety of forms, for example those that are currently commercially available and used in various vending machines and kiosks.

Figure 3:
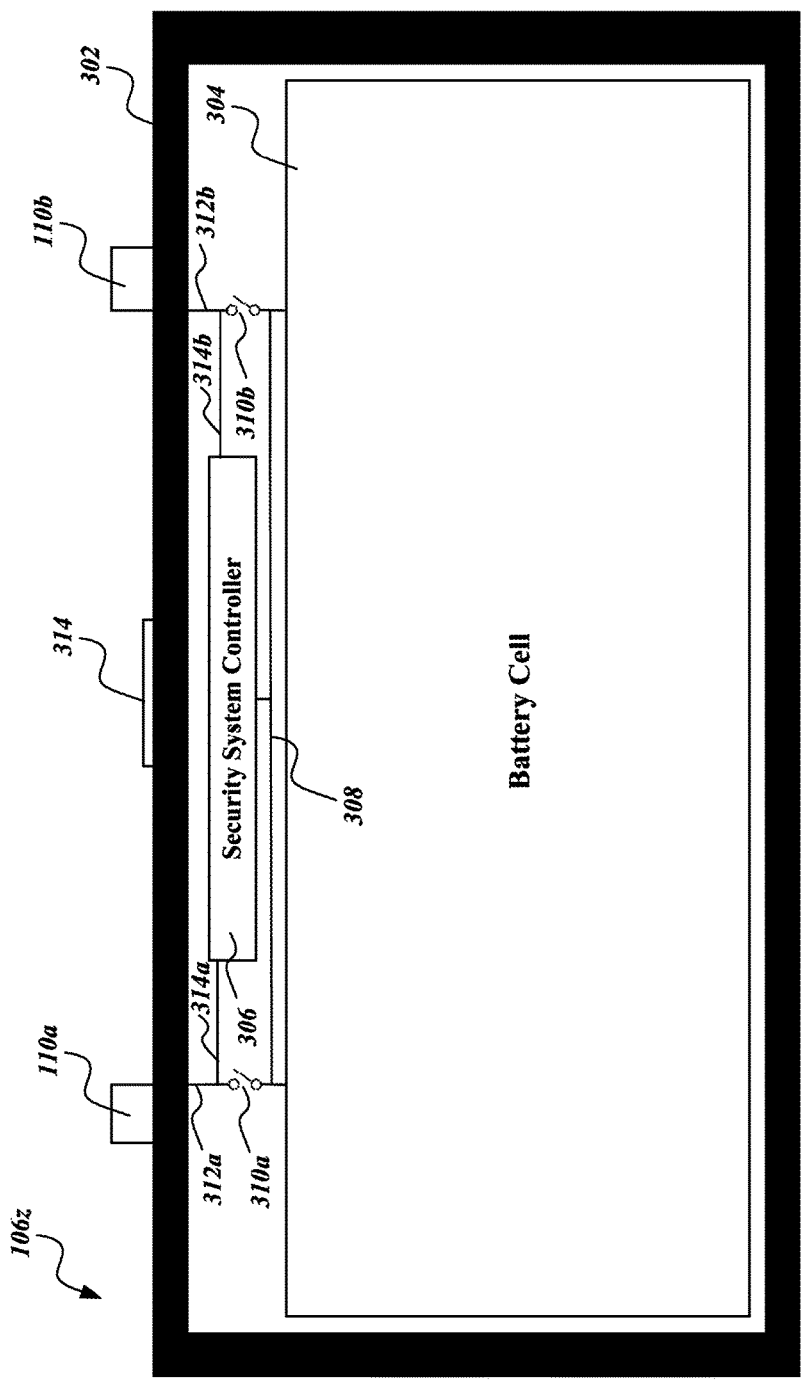
FIG. 3 is a block diagram of the portable electrical energy storage device of FIG. 1, according to one non-limiting illustrated embodiment.

FIG. 3 is a block diagram of the portable electrical energy storage device 106*z* of FIG. 1, according to one non-limiting illustrated embodiment.

Shown is a portable electrical energy storage device housing 302, electrical terminals 110*a*, 110*b*, a battery cell 304, security system controller 306, and a secure access panel 314. The battery cell 304 is any rechargeable type of electrochemical cell that converts stored chemical energy into electrical energy. As described above, the electrical terminals 110*a*, 110*b* are accessible from an exterior of the portable electrical energy storage device 106*z*. The electrical terminals 110 allow charge to be delivered from the portable electrical energy storage device 106*z*, as well as allow charge to be delivered to the portable electrical energy storage device 106*z* for charging or recharging the same through conductive terminal connections 312*a* and 312*b* to the battery cell 304. While illustrated in FIG. 3 as posts, the electrical terminals 110*a* and 110*b* may take any other form which is accessible from an exterior of the portable electrical energy storage device 106*z*, including electrical terminals positioned within slots in the battery housing 302.

Operably coupled to terminal lines 312*a* and 312*b* and the security system controller 308 are two switches 310*a* and 310*b* electronically controlled by the security system controller 306. In a closed position, the switches 310*a* and 310*b* operate to complete a circuit allowing electrical current to flow from or be delivered to the portable electrical energy storage device 106*z*. In an open position, the switches 310*a* and 310*b* operate to break the circuit, preventing electrical current from flowing from and preventing electrical current from being delivered to the portable electrical energy storage device 106*z*. In some embodiments, the switches 310*a* and 310*b* may be any type of electronic or electromechanical switch responsive to signals received from the security system controller 308. The switches 310*a* and 310*b* may include various electrical and/or electronic components including various types of actuators, contacts, relays, rectifiers, power transistors, IGBTs, and/or MOSFETs, etc.

In some embodiments, by default the portable electric storage device 106*z* is in a state where it cannot accept a charge unless the portable electric storage device 106*z* receives authentication from the charging device or other external device (e.g., via a wireless signal). For example, such authentication may be made based on information received via components enabling short range (e.g., via Bluetooth, near field communication (NFC), radio frequency identification (RFID) components and protocols) or longer range wireless communications (e.g., over a wireless LAN, satellite, or cellular network) with various other devices external to the portable electric storage device 106*z*.

The information received on which the authentication may be based may include, but is not limited to, one or more of a code, a password, electronic credentials, electronic security certificate, encrypted data, encryption key, electronic key, etc.

The security system controller 306 is configured to send a signal to open or close the switches 310*a* and 310*b* based on an authentication from an external device to which the portable electric storage device 106*z* is to be connected to receive a charge or to deliver energy. The portable electric storage device security system controller 306 is also configured to regulate the amount of energy to release from the portable electric storage device 106*z* (e.g., based on a user profile), if any, when both switches 310*a* and 310*b* are in the open position, via regulating current flowing through the portable electric storage device security system controller 306 on lines 314*a* and 314*b* coupled to the terminals 110*a* and 110*b* and the portable electric storage device security system controller 306, and line 308 coupled to the portable electric storage device security system controller 306 and the battery cell 304. The regulation of the energy release from the portable electric storage device 106*z* may be in response to various information or other wireless signals from devices external to the portable electric storage device 106*z*. For example, in some instances, a user may select a desired power or performance level of the portable electric storage device 106*z* at the point of purchase, rent or exchange at the collection, charging and distribution machine 102, and paying a premium for doing so. Also, the amount of energy released may depend on one or more of the following as indicated by information received by the portable electric storage device security system controller 306: a user profile, a vehicle profile of a user, the subscription level of the user, particular promotions being offered related to the identified user or to general users, demographic information of the user such as (income level, gender, age, net worth, marital status, etc.).

The housing 302 is constructed of a polymer or other durable material of sufficient thickness to protect the battery cell 304 and portable electric storage device security system controller 306 from outside elements and tampering. For example the walls of the housing may be at least approximately 0.25 inch thick and completely surround the battery cell 304 and portable electric storage device security system controller 306 (except for in some embodiments a small vent hole in the housing) such that the battery cell 304 and portable electric storage device security system controller 306 cannot be accessed without a key or other specialized tool to open a locked access panel 314.

In some embodiments, some or all of the components of the portable electric storage device security system controller 306 may be located outside of the portable electric storage device 106*z* as a separate device that actuates the switches 310*a* and 310*b* (e.g., via a wireless control signal). Also additional or fewer switches may be used sufficient to prevent or allow the flow of current to and from the battery cell 304.

Figure 4:
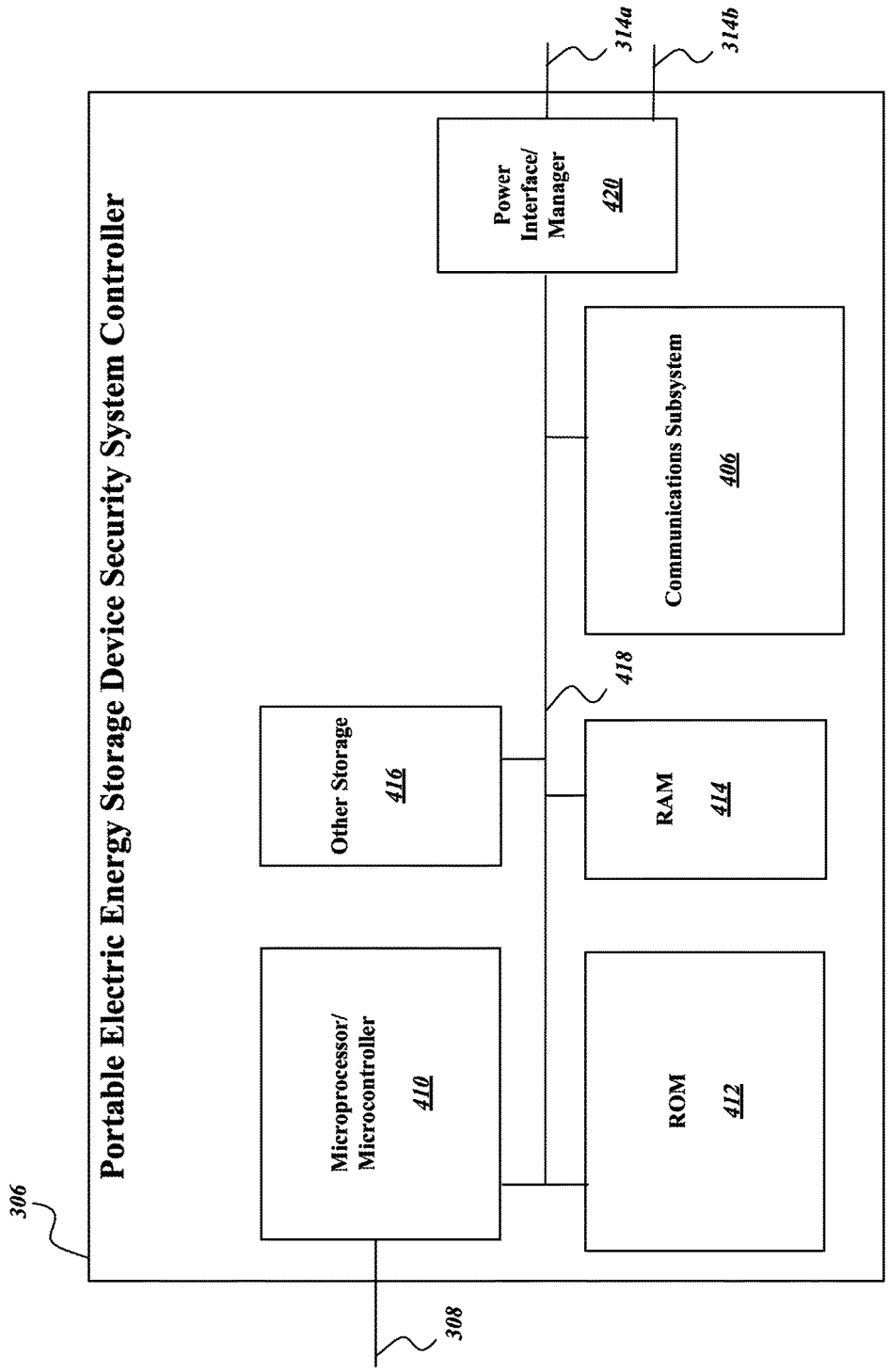
FIG. 4 is a schematic view of the portable electrical energy storage device security system controller of FIG. 3, according to one non-limiting illustrated embodiment.

FIG. 4 is a schematic view of the portable electrical energy storage device security system controller 306 of FIG. 1 and FIG. 3, according to one non-limiting illustrated embodiment.

The portable electric storage device security system controller 306 includes a controller 410, a communications subsystem 406, and a power interface/manager.

The controller 410, for example is a microprocessor, microcontroller, programmable logic controller (PLC), programmable gate array (PGA), application specific integrated circuit (ASIC) or another controller capable of receiving signals from various sensors, performing logical operations, and sending signals to various components. Typically, the controller 410 may take the form of a microprocessor (e.g., INTEL, AMD, ATOM). The portable electric storage device security system controller 306 may also include one or more non-transitory processor- or computer-readable storage media, for example read only memory (ROM) 412, random access memory (RAM) 414, and other storage 416 (e.g., solid-state storage media such as flash memory or EEPROM, spinning storage media such as hard disk). The non-transitory processor- or computer-readable storage media 412, 414, 416 may be in addition to any non-transitory storage medium (e.g., registers) which is part of the controller 410. The portable electric storage device security system controller 306 may include one or more buses 418 (only one illustrated) coupling various components together, for example one or more power buses, instruction buses, data buses, etc.

As illustrated, the ROM 412, or some other one of the non-transitory processor- or computer-readable storage media 412, 414, 416, stores instructions and/or data or values for variables or parameters. The sets of data may take a variety of forms, for example a lookup table, a set of records in a database, etc. The instructions and sets of data or values are executable by the controller 410. Execution of the instructions and sets of data or values causes the controller 410 to perform specific acts to cause the portable electric storage device security system controller 306 to generate control signals to allow or prevent the portable electric storage device 106z from accepting a charge or releasing energy, or otherwise regulate the release of energy from the portable electric storage device 106z.

The controller 410 may use RAM 414 in a conventional fashion, for volatile storage of instructions, data, etc. The controller 410 may use data store 416 to log or retain information, for example, information regarding user profile information, vehicle profile information, security codes, credentials, security certificates, passwords, the subscription level of users, particular promotions being offered related to the identified user or to general users, demographic information of users such as (income level, gender, age, net worth, marital status, etc.), information regarding user vehicle locations and telematic and/or telemetric user vehicle information, information regarding portable electrical energy storage device charge capacity, information regarding driving routes of users, etc. The instructions are executable by the controller 410 to control operation of the portable electric storage device security system controller 306 in response to input from remote systems such as those of external devices including but not limited to: charging devices, vehicles, user identification devices (cards, electronic keys, etc.) vehicles, collection, charging and distribution machines, collection, charging and distribution machine service systems, user mobile devices, user vehicles, and end user or operator input, and using data or values for the variables or parameters.

The controller 410 may also receive signals from various sensors and/or components of an external device, such as the communications subsystem 206 of collection, charging and distribution machine 102. This information may include information such as user profile or preference information or other information that characterizes or is indicative of the authenticity, authorization level, operation, status, or condition of such components.

The communications subsystem 406 may include one or more communications modules or components which facilities communications with the various components of external devices and also the various components of the collection, charging and distribution machine 102 of FIG. 1 (e.g., such as to receive software updates or data updates of user profile, vehicle profile and/or promotional campaign information) and one or more user mobile communication devices, such that data may be exchanged between the devices for authentication purposes. The communications subsystem 406 may provide wired and/or wireless communications. The communications subsystem 406 may include one or more ports, wireless receivers, wireless transmitters or wireless transceivers to provide wireless signal paths to the various remote components or systems. The communications subsystem 406 may, for example, include components enabling short range (e.g., via Bluetooth, near field communication (NFC), radio frequency identification (RFID) components and protocols) or longer range wireless communications (e.g., over a wireless LAN, satellite, or cellular network) and may include one or more modems 452 or one or more Ethernet or other types of communications cards or components 454 for doing so. The remote communications subsystem 406 may include one or more bridges or routers suitable to handle network traffic including switched packet type communications protocols (TCP/IP), Ethernet or other networking protocols.

In some embodiments, some or all of the components of the portable electric storage device security system controller 306 may be located outside of the portable electric storage device 106z as a separate device that actuates the switches 310a and 310b of the portable electric storage device 106z (e.g., via a wireless control signal) sent via the communications subsystem 406.

The power Interface/manager 420 is controllable by the controller 410 and is configured to provide power to the portable electric storage device security system controller 306 from either the battery cell 304 or external device. Also, the power Interface/manager 420 is configured to regulate the release of power from the portable electric storage device 106z according to control signals received from the controller 410 (e.g., based on received user profile or preference information) and includes various components operable for doing so such as electrical transformers, converters, rectifiers, etc.

FIG. 5 shows a chart 500 showing an example of a mapping of customer profiles to particular portable electrical energy storage device (e.g., battery) options, according to one non-limiting illustrated embodiment.

Such a mapping may be stored within the collection, charging and distribution machine, be communicated to the collection, charging and distribution machine via a backend system, be stored on the portable electrical energy storage device, or otherwise communicated to the portable electrical energy storage device. Shown is a column 502 indicating example customer profile levels. For each customer profile level, there is an overall battery capacity column 504 which indicates the capacity of the battery a customer of that particular profile level will receive. For each customer profile level, there is also a battery age column 506 which indicates the age of the battery a customer of that particular profile level will receive. For each customer profile level, there is also a battery electrical current release column 508 which indicates the electrical current release of the battery a customer of that particular profile level will receive. In addition, for each customer profile level, there is also a number of previous charge cycles column 508 which indicates the number of previous charge cycles of the battery a customer of that particular profile level will receive. Note that customers of higher profile levels receive premium batteries. However, at the point of receiving the battery, the customer may upgrade their profile or pay a one-time upgrade fee for a higher performance or premium battery (e.g., newer batteries, for instance those which are chronologically newer and/or those which have been subjected to fewer recharge cycles; higher performance chemistry; batteries which have been subjected to less extreme discharging rates and/or depths of discharge; batteries which have been subjected to less extreme charging rates and/or subjected to less extreme environmental conditions measured for instance as a total number of exposures to excessive temperatures and/or a total or accumulated time of exposure to excessive temperatures, for instance relative to other batteries or to some defined conditions or thresholds; batteries with higher electrical energy storage capacity; compared to other batteries; batteries with a higher a current charge level compared to other batteries; batteries with a higher percentage of charge level to a charge capacity of the battery compared to other batteries).

Thus, various examples of performance characteristics of portable electrical energy storage devices that differentiate batteries (e.g., premium batteries from other batteries) that the customer may receive include, but are not limited to: an age of the portable electrical energy storage device, a capacity of the portable electrical energy storage device, a current charge level of the portable electrical energy storage device, a percentage of charge level to a charge capacity of the portable electrical energy storage device, a total cumulative number of charge cycles that the portable electrical energy storage device has experienced to date, number or frequency of deep discharges of the portable electrical energy storage device, temperature exposure of the portable electrical energy storage device, a value that represents number or frequency of charge cycles of the portable electrical energy storage device, and whether the portable electrical energy storage device has been used by drivers with aggressive driving profiles. The driving profile of a driver may be determined by the collection, charging and distribution machine and/or the back end or back office system 120 by receiving information regarding items such as accelerator readings of the driver which correlate to instances of high acceleration and recorded levels of current draw while the driver is using the portable electrical energy storage device.

Also, customers of higher profiles may receive access to premium collection, charging and distribution machines or collection, charging and distribution machines in premium locations, or access to a "VIP" line at the collection, charging and distribution machine, etc.

FIG. 6 shows a high level method 600 of operating a controller 210 of a portable electrical energy storage device collection, charging and distribution machine of FIG. 2, according to one non-limiting illustrated embodiment.

At 602, the portable electrical energy storage device collection, charging and distribution machine controller 210 receives a request for a portable electrical energy storage device from a user at a portable electrical energy storage device collection, charging and distribution machine.

At 604, the portable electrical energy storage device collection, charging and distribution machine controller 210 automatically selects a portable electrical energy storage device in the portable electrical energy storage device collection, charging and distribution machine having particular performance characteristics, the selection based on a received user profile of the user (e.g., vehicle operator or driver). The automatic selection of the portable electrical energy storage device may, in some embodiments, include selecting the portable electrical energy storage device based on past route information indicative of a number of aspects of a number of past routes taken by the user as indicated on the user profile. For example, if the user has previously taken long routes on which there were very few or no collection, charging and distribution machines, the portable electrical energy storage device collection, charging and distribution machine controller 210 may select a fully charged portable electrical energy storage device with a higher electrical energy storage capacity (as compared to other available portable electrical energy storage devices) to provide a long range for the user. In some embodiments, the automatic selection of the portable electrical energy storage device may also include selecting the portable electrical energy storage device based on one or more vehicle specifications as indicated on the user profile. For example, the portable electrical energy storage device collection, charging and distribution machine controller 210 may select a portable electrical energy storage device with a higher electrical energy storage capacity or higher energy release level (as compared to other available portable electrical energy storage devices) for users with vehicles having a larger motors or otherwise having higher energy requirements.

At 606, the portable electrical energy storage device collection, charging and distribution machine controller 210 automatically releases the selected portable electrical energy storage device for the user.

FIG. 7 shows a low level method 700 of operating the portable electrical energy storage device collection, charging and distribution machine controller 210 of FIG. 2, according to one non-limiting illustrated embodiment, including selecting a portable electrical energy storage device with higher performance characteristics, useful in the method of FIG. 6.

At 702, the portable electrical energy storage device collection, charging and distribution machine controller 210 selects a portable electrical energy storage device with higher performance characteristics than another portable electrical energy storage device in the portable electrical energy storage device collection, charging and distribution machine that would be selected for another user associated with another user profile that indicates a lower subscription level for use of the portable electrical energy storage device collection, charging and distribution machine.

FIG. 8 shows a low level method 800 of operating the portable electrical energy storage device collection, charging and distribution machine controller of FIG. 2, according to one non-limiting illustrated embodiment, including determining a driving profile of a driver, useful in the method of FIG. 6.

At 802, the portable electrical energy storage device collection, charging and distribution machine controller 210 determines a driving profile of a driver by receiving information regarding the driving profile based on one or more of: accelerator readings of the driver which correlate to instances of high acceleration, and levels of current draw during a use of the driver of a portable electrical energy storage device.

FIG. 9 shows a low level method 900 of operating the portable electrical energy storage device collection, charging and distribution machine controller of FIG. 2, according to one non-limiting illustrated embodiment, including a process of releasing the portable electrical energy storage device to the user, useful in the method of FIG. 6.

At 902, the portable electrical energy storage device collection, charging and distribution machine controller 210 receives a signal indicative that a used portable electrical energy storage device has been received by the portable electrical energy storage device collection, charging and distribution machine from the user before releasing the portable electrical energy storage device.

FIG. 10 shows a low level method 1000 of operating the portable electrical energy storage device collection, charging and distribution machine controller of FIG. 2, according to one non-limiting illustrated embodiment, including configuring a security system of the portable electrical energy storage device, useful in the method of FIG. 6.

At 1002, the portable electrical energy storage device collection, charging and distribution machine controller 210 determines, based on the received user profile, a particular level of energy to release from the portable electrical energy storage device for use by the user.

At 1004, the portable electrical energy storage device collection, charging and distribution machine controller 210 configures a security system of the portable electrical energy storage device to release energy from the portable electrical energy storage device at the determined particular level for use by the user based on the received user profile.

FIG. 11 shows a low level method 1100 of operating the portable electrical energy storage device collection, charging and distribution machine controller of FIG. 2, according to one non-limiting illustrated embodiment, including selecting the portable electrical energy storage device based on a prioritization system, useful in the method of FIG. 6.

At 1102, the portable electrical energy storage device collection, charging and distribution machine controller 210 selects the portable electrical energy storage device based on a prioritization system between users that is configured to compare the received user profile to other user profiles.

The foregoing detailed description has set forth various embodiments of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. In one embodiment, the present subject matter may be implemented via one or more microcontrollers. However, those skilled in the art will recognize that the embodiments disclosed herein, in whole or in part, can be equivalently implemented in standard integrated circuits (e.g., Application Specific Integrated Circuits or ASICs), as one or more computer programs executed by one or more computers (e.g., as one or more programs running on one or more computer systems), as one or more programs executed by on one or more controllers (e.g., microcontrollers) as one or more programs executed by one or more processors (e.g., microprocessors), as firmware, or as virtually any combination thereof, and that designing the circuitry and/or writing the code for the software and/or firmware would be well within the skill of one of ordinary skill in the art in light of the teachings of this disclosure.

When logic is implemented as software and stored in memory, logic or information can be stored on any non-transitory computer-readable medium for use by or in connection with any processor-related system or method. In the context of this disclosure, a memory is a nontransitory computer- or processor-readable storage medium that is an electronic, magnetic, optical, or other physical device or means that non-transitorily contains or stores a computer and/or processor program. Logic and/or the information can be embodied in any computer-readable medium for use by or in connection with an instruction execution system, apparatus, or device, such as a computer-based system, processor-containing system, or other system that can fetch the instructions from the instruction execution system, apparatus, or device and execute the instructions associated with logic and/or information.

In the context of this specification, a "computer-readable medium" can be any physical element that can store the program associated with logic and/or information for use by or in connection with the instruction execution system, apparatus, and/or device. The computer-readable medium can be, for example, but is not limited to, an electronic, magnetic, optical, electromagnetic, infrared, or semiconductor system, apparatus or device. More specific examples (a non-exhaustive list) of the computer readable medium would include the following: a portable computer diskette (magnetic, compact flash card, secure digital, or the like), a random access memory (RAM), a read-only memory (ROM), an erasable programmable read-only memory (EPROM, EEPROM, or Flash memory), a portable compact disc read-only memory (CDROM), and digital tape.

The various embodiments described above can be combined to provide further embodiments. To the extent that they are not inconsistent with the specific teachings and definitions herein, all of the U.S. patents, U.S. patent application publications, U.S. patent applications, foreign patents, foreign patent applications and non-patent publications referred to in this specification and/or listed in the Application Data Sheet, including but not limited to: U.S. provisional patent application Ser. No. 61/511,900 entitled "APPARATUS, METHOD AND ARTICLE FOR COLLECTION, CHARGING AND DISTRIBUTING POWER STORAGE DEVICES, SUCH AS BATTERIES" and filed Jul. 26, 2011, U.S. provisional patent application Ser. No. 61/647,936 entitled "APPARATUS, METHOD AND ARTICLE FOR COLLECTION, CHARGING AND DISTRIBUTING POWER STORAGE DEVICES, SUCH AS BATTERIES" and filed May 16, 2012, U.S. provisional patent application Ser. No. 61/534,753 entitled "APPARATUS, METHOD AND ARTICLE FOR REDISTRIBUTING POWER STORAGE DEVICES, SUCH AS BATTERIES, BETWEEN COLLECTION, CHARGING AND DISTRIBUTION MACHINES" and filed Sep. 14, 2011, U.S. provisional patent application Ser. No. 61/534,761 entitled "APPARATUS, METHOD AND ARTICLE FOR AUTHENTICATION, SECURITY AND CONTROL OF POWER STORAGE DEVICES SUCH AS BATTERIES" and filed Sep. 14, 2011, U.S. provisional patent application Ser. No. 61/534,772 entitled "APPARATUS, METHOD AND ARTICLE FOR AUTHENTICATION, SECURITY AND CONTROL OF POWER STORAGE DEVICES, SUCH AS BATTERIES, BASED ON USER PROFILES" and filed Sep. 14, 2011, U.S. provisional patent application Ser. No. 61/511,887 entitled "THERMAL MANAGEMENT OF COMPONENTS IN ELECTRIC MOTOR DRIVE VEHICLES" and filed Jul. 26, 2011, U.S. provisional patent application Ser. No. 61/647,941 entitled "THERMAL MANAGEMENT OF COMPONENTS IN ELECTRIC MOTOR DRIVE VEHICLES" and filed May 16, 2012, U.S. provisional patent application Ser. No. 61/511,880 entitled "DYNAMICALLY LIMITING VEHICLE OPERATION FOR BEST EFFORT ECONOMY" and filed Jul. 26, 2011, U.S. provisional patent application Ser. No. 61/557,170 entitled "APPARATUS, METHOD, AND ARTICLE FOR PHYSICAL SECURITY OF POWER STORAGE DEVICES IN VEHICLES" and filed Nov. 8, 2011, U.S.

provisional patent application Ser. No. 61/581,566 entitled "APPARATUS, METHOD AND ARTICLE FOR A POWER STORAGE DEVICE COMPARTMENT" and filed Dec. 29, 2011, U.S. provisional patent application Ser. No. 61/601,404 entitled "APPARATUS, METHOD AND ARTICLE FOR PROVIDING VEHICLE DIAGNOSTIC DATA" and filed Feb. 21, 2012, U.S. provisional patent application Ser. No. 61/601,949 entitled "APPARATUS, METHOD AND ARTICLE FOR PROVIDING LOCATIONS OF POWER STORAGE DEVICE COLLECTION, CHARGING AND DISTRIBUTION MACHINES" and filed Feb. 22, 2012, and U.S. provisional patent application Ser. No. 61/601,953 entitled "APPARATUS, METHOD AND ARTICLE FOR PROVIDING INFORMATION REGARDING AVAILABILITY OF POWER STORAGE DEVICES AT A POWER STORAGE DEVICE COLLECTION, CHARGING AND DISTRIBUTION MACHINE" and filed Feb. 22, 2012, U.S. application Ser. No. 13/559,314, filed on Jul. 26, 2012, naming Hok-Sum Horace Luke, Matthew Whiting Taylor and Huang-Cheng Hung as inventors and entitled "APPARATUS, METHOD AND ARTICLE FOR COLLECTION, CHARGING AND DISTRIBUTING POWER STORAGE DEVICES, SUCH AS BATTERIES", U.S. application Ser. No. 13/559,264, filed on Jul. 26, 2012 naming Hok-Sum Horace Luke and Matthew Whiting Taylor as inventors and entitled "DYNAMICALLY LIMITING VEHICLE OPERATION FOR BEST EFFORT ECONOMY", U.S. application Ser. No. 13/559,054, filed on Jul. 26, 2012, naming Matthew Whiting Taylor, Yi-Tsung Wu, Hok-Sum Horace Luke and Huang-Cheng Hung as inventors and entitled "APPARATUS, METHOD, AND ARTICLE FOR PHYSICAL SECURITY OF POWER STORAGE DEVICES IN VEHICLES", U.S. application Ser. No. 13/559,390, filed on Jul. 26, 2012, naming Ching Chen, Hok-Sum Horace Luke, Matthew Whiting Taylor, Yi-Tsung Wu as inventors and entitled "APPARATUS, METHOD AND ARTICLE FOR PROVIDING VEHICLE DIAGNOSTIC DATA", U.S. application Ser. No. 13/559,343, filed on Jul. 26, 2012, naming Yi-Tsung Wu, Matthew Whiting Taylor, Hok-Sum Horace Luke and Jung-Hsiu Chen as inventors and entitled "APPARATUS, METHOD AND ARTICLE FOR PROVIDING INFORMATION REGARDING AVAILABILITY OF POWER STORAGE DEVICES AT A POWER STORAGE DEVICE COLLECTION, CHARGING AND DISTRIBUTION MACHINE", and U.S. application Ser. No. 13/559,064, filed on Jul. 26, 2012, naming Hok-Sum Horace Luke, Yi-Tsung Wu, Jung-Hsiu Chen, Yulin Wu, Chien Ming Huang, TsungTing Chan, Shen-Chi Chen and Feng Kai Yang as inventors and entitled "APPARATUS, METHOD AND ARTICLE FOR RESERVING POWER STORAGE DEVICES AT RESERVING POWER STORAGE DEVICE COLLECTION, CHARGING AND DISTRIBUTION MACHINES" are incorporated herein by reference, in their entirety. Aspects of the embodiments can be modified, if necessary, to employ systems, circuits and concepts of the various patents, applications and publications to provide yet further embodiments.

While generally discussed in the environment and context of collection, charging and distribution of portable electrical energy storage devices for use with personal transportation vehicle such as all-electric scooters and/or motorbikes, the teachings herein can be applied in a wide variety of other environments, including other vehicular as well as non-vehicular environments.

The above description of illustrated embodiments, including what is described in the Abstract of the Disclosure, is not intended to be exhaustive or to limit the embodiments to the precise forms disclosed. Although specific embodiments and examples are described herein for illustrative purposes, various equivalent modifications can be made without departing from the spirit and scope of the disclosure, as will be recognized by those skilled in the relevant art.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

We claim:

1. A method of operating a controller of a portable electrical energy storage device collection, charging and distribution machine, comprising:

receiving, by the controller of the portable electrical energy storage device collection, charging and distribution machine, a request for a portable electrical energy storage device from a user at a portable electrical energy storage device collection, charging and distribution machine;

automatically selecting, by the controller of the portable electrical energy storage device collection, charging and distribution machine, a portable electrical energy storage device in the portable electrical energy storage device collection, charging and distribution machine having particular performance characteristics, the selection based on a received user profile of the user that is indicative of a performance level of the portable electrical energy storage device; and automatically releasing the selected portable electrical energy storage device for the user;

determining, by the controller of the portable electrical energy storage device collection, charging and distribution machine, based on the received user profile, a particular level of energy to release from the portable electrical energy storage device for use by the user; and configuring, by the controller of the portable electrical energy storage device collection, charging and distribution machine, a security system of the portable electrical energy storage device to release energy from the portable electrical energy storage device at the determined particular level for use by the user based on the received user profile.

2. The method of claim 1 wherein the automatically selecting includes selecting a portable electrical energy storage device with higher performance characteristics than another portable electrical energy storage device in the portable electrical energy storage device collection, charging and distribution machine that would be selected for another user associated with another user profile that indicates a lower subscription level for use of the portable electrical energy storage device collection, charging and distribution machine.

3. The method of claim 2 wherein the performance characteristics include one or more of: an age of the portable electrical energy storage device, a capacity of the portable electrical energy storage device, a current charge level of the portable electrical energy storage device, a percentage of charge level to a charge capacity of the portable electrical energy storage device, a total cumulative number of charge cycles that the portable electrical energy storage device has experienced to date, number or frequency of deep discharges of the portable electrical energy storage device, temperature exposure of the portable electrical energy storage device, a value that represents number or frequency of charge cycles of the portable electrical energy storage device, whether the portable electrical energy storage device has been used by drivers with aggressive driving profiles.

4. The method of claim 3 further comprising determining, by the configured controller of the portable electrical energy storage device collection, charging and distribution machine, a driving profile of a driver by receiving information regarding the driving profile based on one or more of: accelerator readings of the driver which correlate to instances of high acceleration, and levels of current draw during a use of the driver of a portable electrical energy storage device.

5. The method of claim 2 further comprising:
receiving a signal indicative that a used portable electrical energy storage device has been received by the portable electrical energy storage device collection, charging and distribution machine from the user before releasing the portable electrical energy storage device.

6. The method of claim 1 wherein the configuring occurs before the releasing of the portable electrical energy storage device.

7. The method of claim 1 further comprising:
receiving the user profile over a wireless connection.

8. The method of claim 7 wherein the receiving the user profile includes receiving the user profile via a mobile device of the user.

9. The method of claim 1 wherein the automatically selecting the portable electrical energy storage device includes selecting the portable electrical energy storage device based on past route information indicative of a number of aspects of a number of past routes taken by the user as indicated on the user profile.

10. The method of claim 1 wherein the automatically selecting the portable electrical energy storage device includes selecting the portable electrical energy storage device based on one or more vehicle specifications as indicated on the user profile.

11. The method of claim 1 wherein the automatically selecting the portable electrical energy storage device includes selecting the portable electrical energy storage device based on a prioritization system between users that is configured to compare the received user profile to other user profiles.

* * * * *